United States Patent
Colle et al.

(10) Patent No.: US 11,954,848 B2
(45) Date of Patent: Apr. 9, 2024

(54) METHOD AND INSTALLATION FOR THE IN-LINE DIMENSIONAL CONTROL OF MANUFACTURED OBJECTS

(71) Applicant: TIAMA, Vourles (FR)

(72) Inventors: Olivier Colle, Oullins (FR); Benoit Cance, Pont de Montvert (FR); Laurent Cosneau, Soucieu-en-Jarrest (FR); Laurent Desbat, Grenoble (FR); Emanuel Maitre, Saint Martin d'Heres (FR); Nicolas Szafran, Gieres (FR)

(73) Assignee: TIAMA, Saint-Genis-Laval (FR)

( * ) Notice: Subject to any disclaimer, the term of this patent is extended or adjusted under 35 U.S.C. 154(b) by 292 days.

(21) Appl. No.: 17/603,658

(22) PCT Filed: Apr. 24, 2020

(86) PCT No.: PCT/FR2020/050712
§ 371 (c)(1),
(2) Date: Oct. 14, 2021

(87) PCT Pub. No.: WO2020/217036
PCT Pub. Date: Oct. 29, 2020

(65) Prior Publication Data
US 2022/0237761 A1    Jul. 28, 2022

(30) Foreign Application Priority Data
Apr. 26, 2019    (FR) ........................................ 1904491

(51) Int. Cl.
*G06T 7/64*    (2017.01)
*G01B 15/00*    (2006.01)
(Continued)

(52) U.S. Cl.
CPC .............. *G06T 7/001* (2013.01); *G01B 15/00* (2013.01); *G06T 7/64* (2017.01); *G06T 17/00* (2013.01);
(Continued)

(58) Field of Classification Search
CPC ........................................................ G06T 7/001
See application file for complete search history.

(56) References Cited

U.S. PATENT DOCUMENTS

| 5,602,890 A | 2/1997 | Gray et al. |
| 7,204,640 B2 * | 4/2007 | Fu .......................... G01N 23/04 |
| | | 378/65 |

(Continued)

FOREIGN PATENT DOCUMENTS

| DE | 197 56 697 | 7/1999 |
| DE | 10 2014 103 137 | 9/2015 |

(Continued)

OTHER PUBLICATIONS

Kruth J. P. et al., "Computed Tomography for Dimensional Metrology", CIRP Annals, vol. 60, No. 2, Dec. 31, 2011, pp. 821-842.

*Primary Examiner* — Oneal R Mistry
(74) *Attorney, Agent, or Firm* — Clark & Brody LP

(57) ABSTRACT

The invention relates to a method and an installation for automatically measuring linear dimensions of manufactured objects (2) of a series comprising:
  the disposition of at least one focal point (Fj) of X-rays, on a same base straight line parallel to the rectilinear trajectory of displacement of the objects and of one or several image sensors (Ci);
  the acquisition, for each object during its displacement, of a set of one-dimensional images comprising, for a number (NK) of distinct section planes (Pk) containing the base straight line, a number (NP) of said images
(Continued)

obtained along at least three different directions of projection (Dijk) in the section plane;

for each object, and for each distinct section plane (Pk), the determination, from the images obtained, of a delineation of the object in the considered section plane (Pk).

33 Claims, 8 Drawing Sheets

(51) Int. Cl.
    *G06T 7/00*     (2017.01)
    *G06T 17/00*     (2006.01)
    *H04N 23/56*     (2023.01)
    *H04N 23/90*     (2023.01)

(52) U.S. Cl.
    CPC ............. *H04N 23/56* (2023.01); *H04N 23/90* (2023.01); *G06T 2200/08* (2013.01); *G06T 2207/10028* (2013.01); *G06T 2207/10116* (2013.01); *G06T 2207/30108* (2013.01); *G06T 2207/30241* (2013.01); *G06T 2210/56* (2013.01)

(56) References Cited

U.S. PATENT DOCUMENTS

| | | |
|---|---|---|
| 7,221,732 B1 | 5/2007 | Annis |
| 2007/0237293 A1 | 10/2007 | Singh |
| 2009/0262891 A1 | 10/2009 | Zhang et al. |
| 2010/0008465 A1* | 1/2010 | Matsuura ............. A61B 6/4085 378/92 |
| 2010/0220910 A1 | 9/2010 | Kaucic et al. |
| 2012/0004513 A1 | 1/2012 | Robinson |
| 2013/0170611 A1 | 7/2013 | Beckmann et al. |
| 2018/0172849 A1* | 6/2018 | Nelson ................ G01T 1/20182 |
| 2020/0014617 A1 | 1/2020 | Qiao |
| 2020/0299169 A1 | 9/2020 | Cosneau et al. |
| 2020/0300619 A1 | 9/2020 | Cosneau et al. |
| 2020/0319010 A1 | 10/2020 | Cosneau et al. |
| 2020/0333133 A1 | 10/2020 | Cosneau et al. |

FOREIGN PATENT DOCUMENTS

| | | |
|---|---|---|
| JP | 60-260807 | 12/1985 |
| JP | 2007-139764 | 6/2007 |
| JP | 2008-256603 | 10/2008 |
| JP | 2017-533414 | 11/2017 |

* cited by examiner

[Fig. 1]
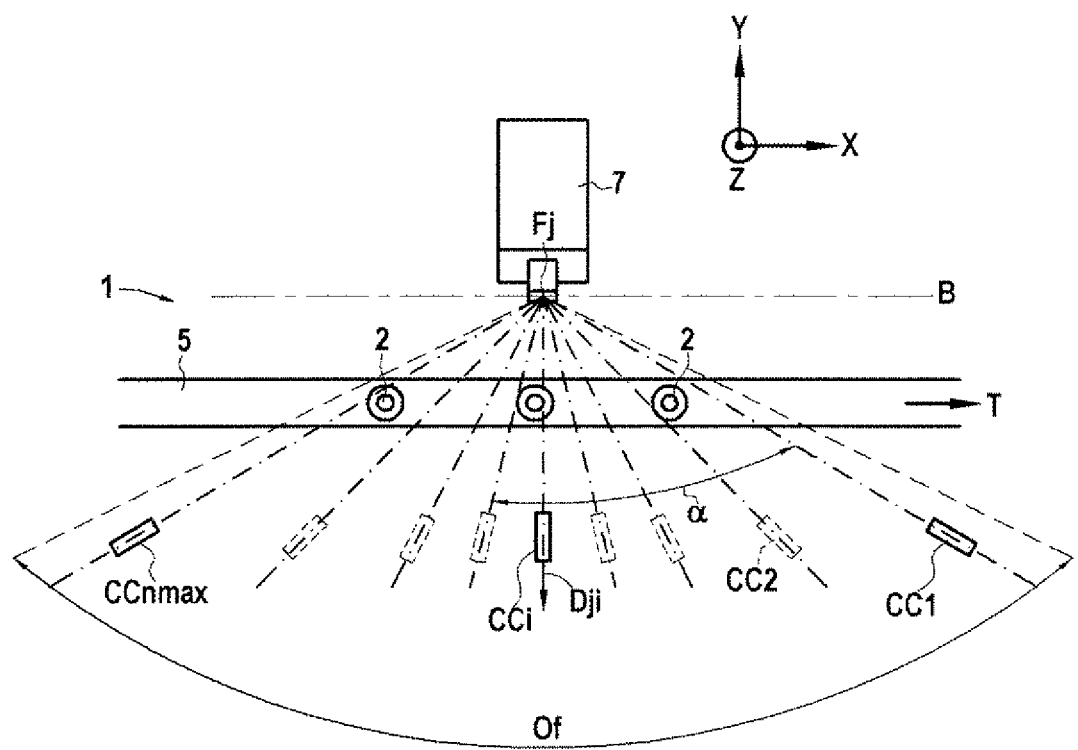

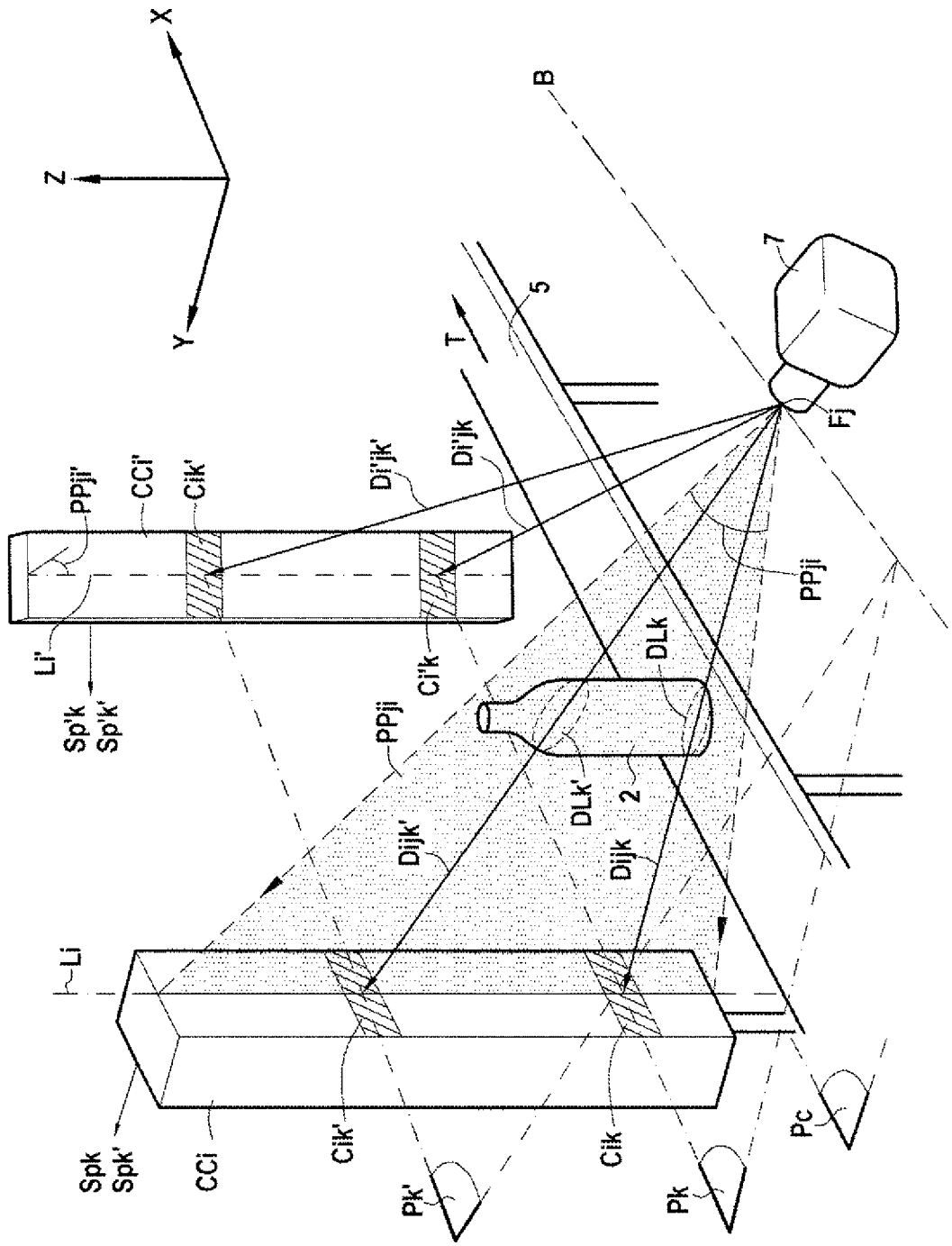
[Fig. 2]

[Fig. 3]
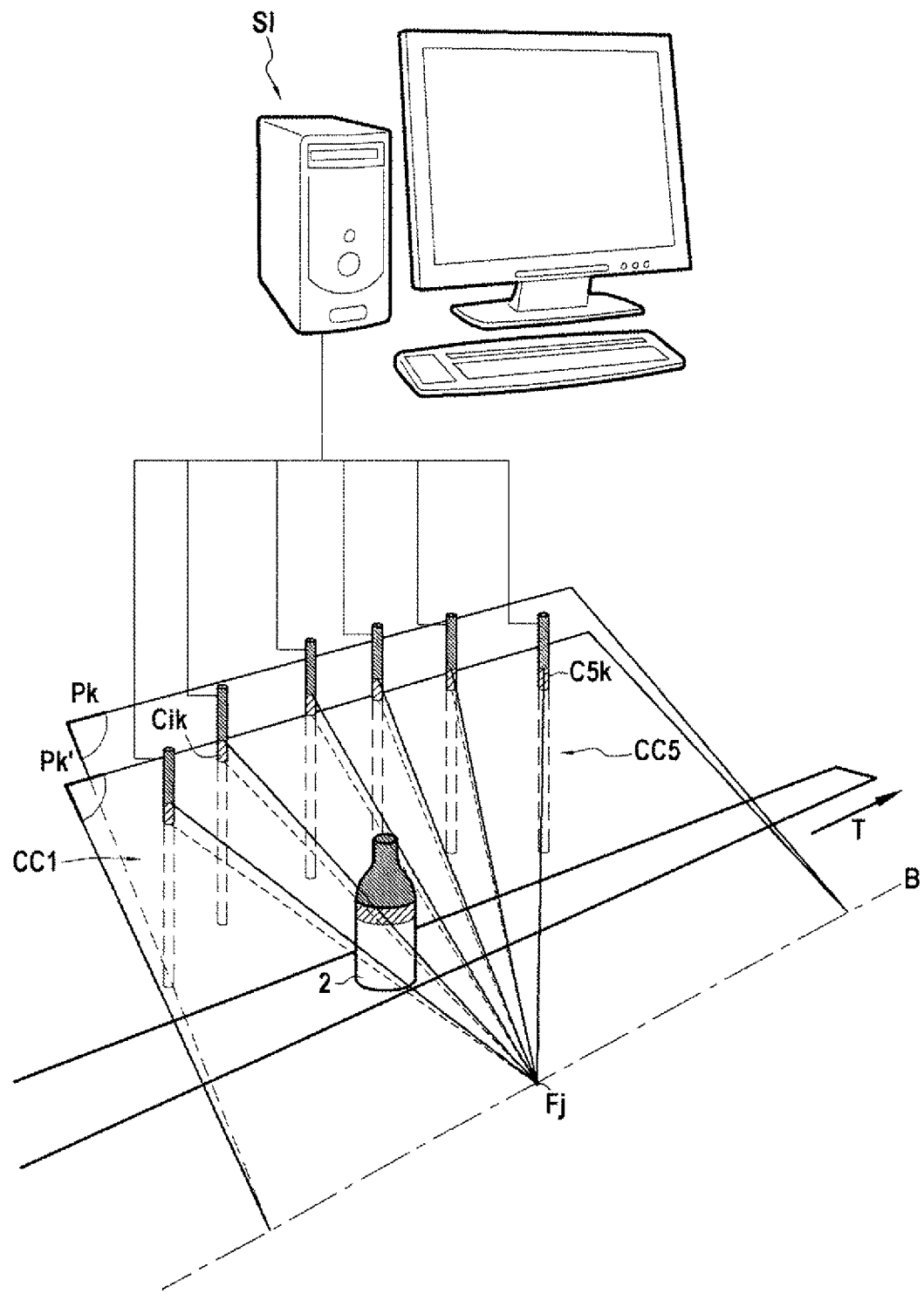

[Fig. 4]
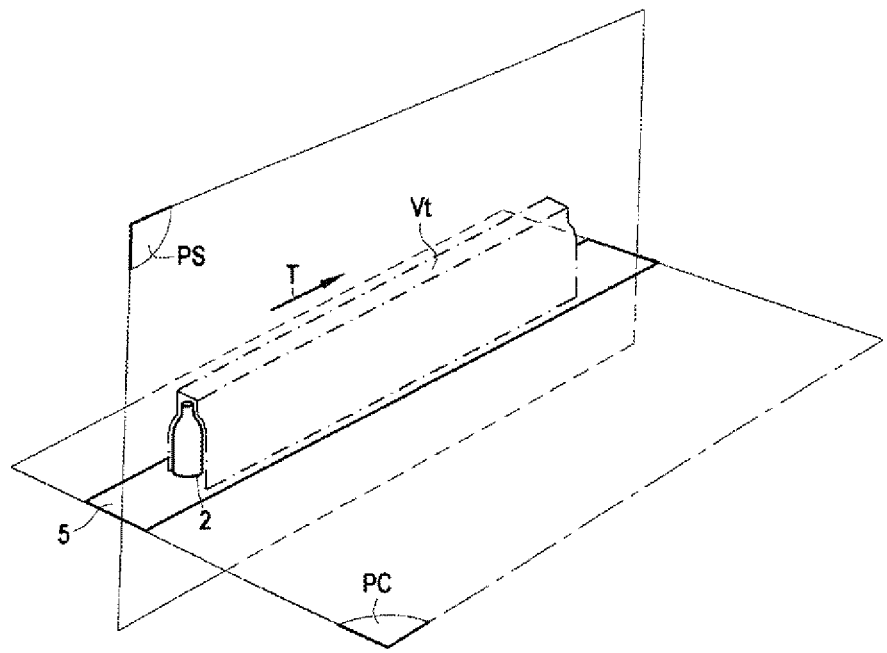
[Fig. 5]
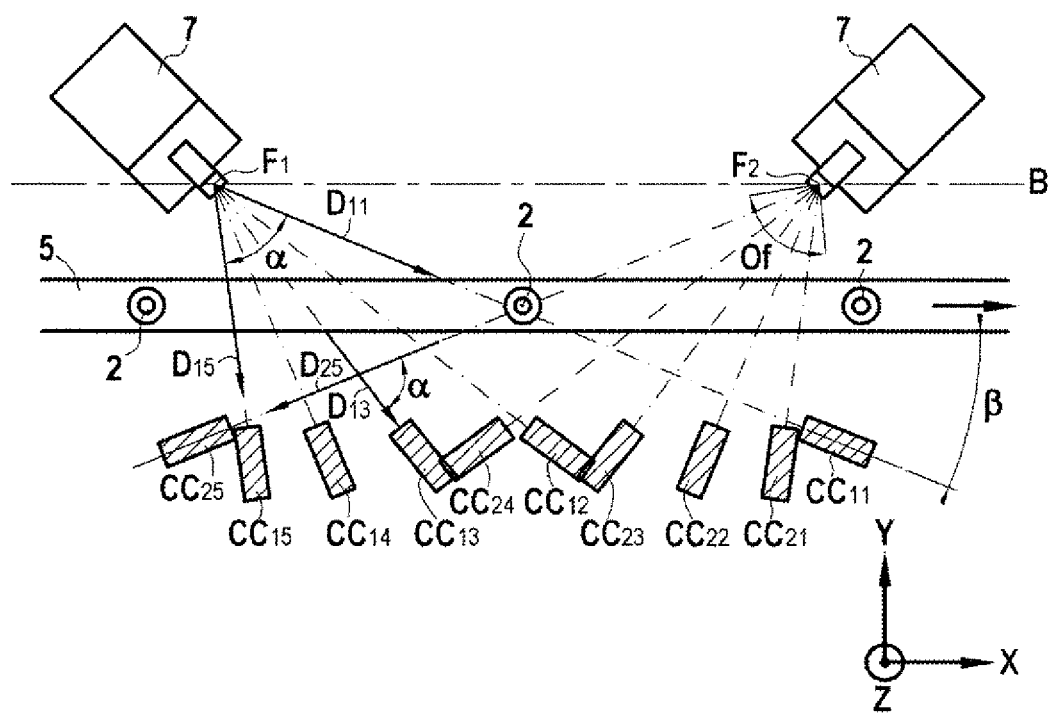

[Fig. 6]
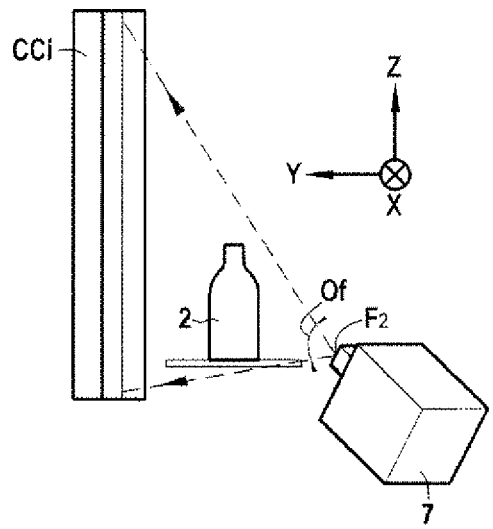
[Fig. 7]
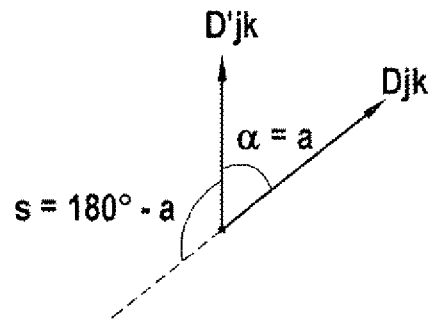
[Fig. 8]
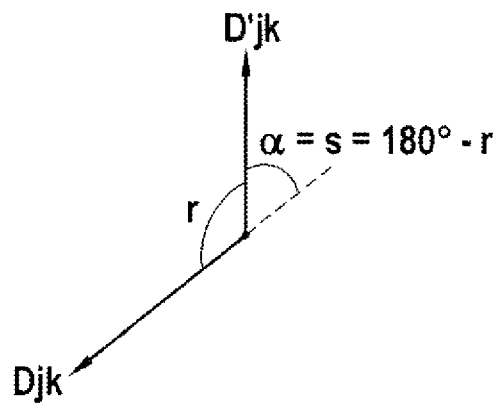

[Fig. 9]
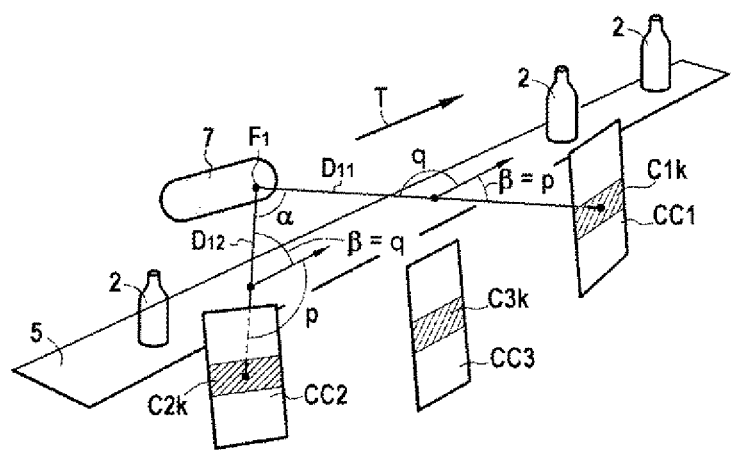
[Fig. 10]
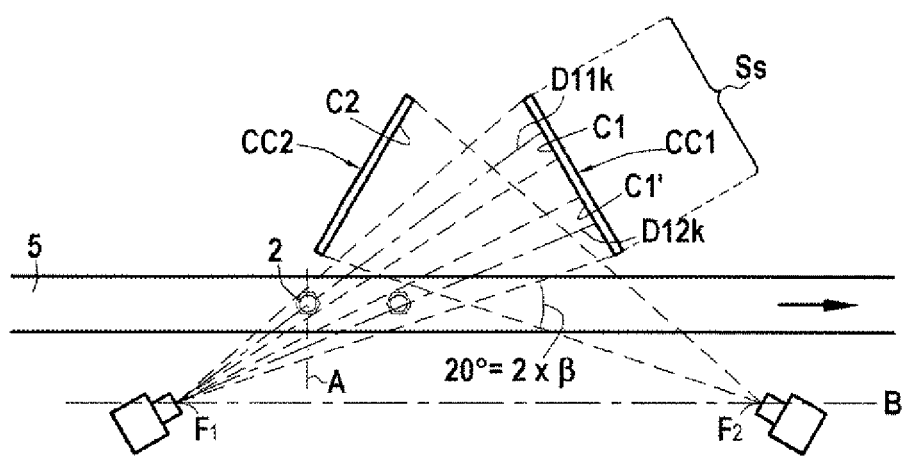

[Fig. 11]
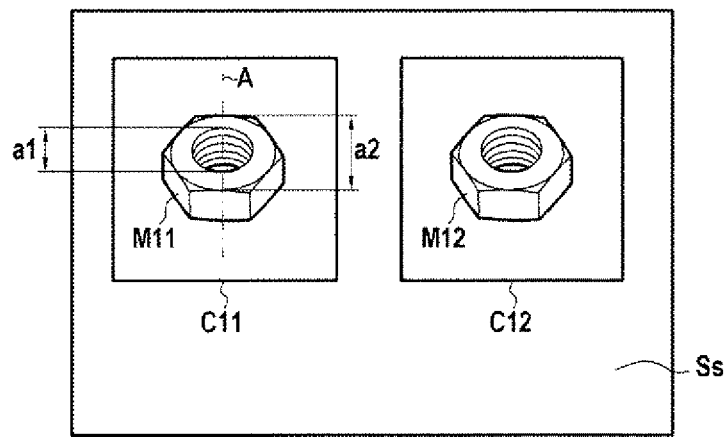
[Fig. 12]
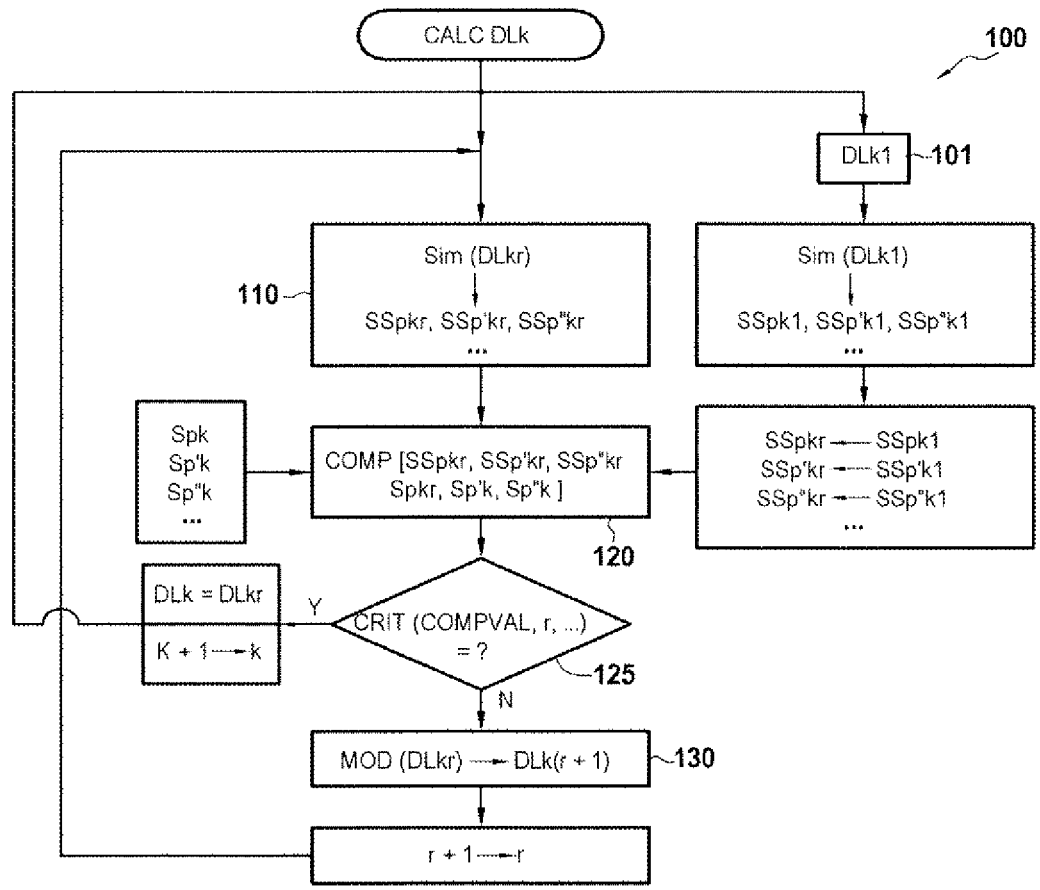

[Fig. 13]
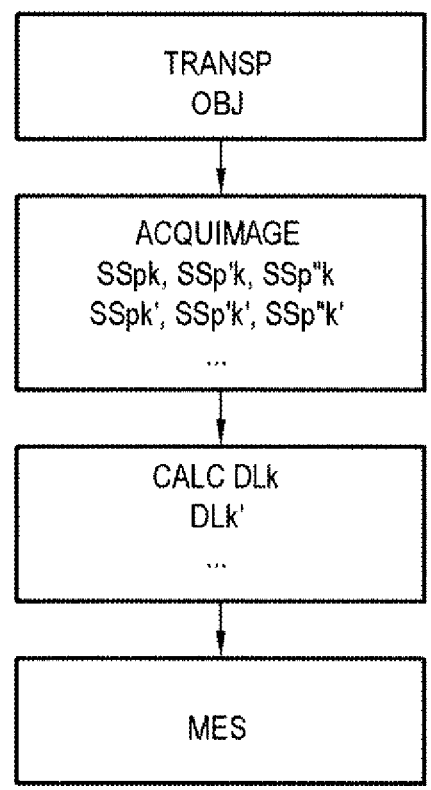

METHOD AND INSTALLATION FOR THE IN-LINE DIMENSIONAL CONTROL OF MANUFACTURED OBJECTS

TECHNICAL FIELD

The invention relates to the field of dimensional X-ray check of manufactured objects forming a series of objects.

The object of the invention aims more particularly to obtain the X-ray measurement of linear dimensions, that is to say of the lengths taken on manufactured objects in the general sense, such as for example on containers, molded or machined pieces, mechanical pieces, packaging, bodywork elements.

PRIOR ART

The prior art knows various techniques allowing the dimensional check of objects by X-rays. Luggage inspection systems are also known, which do not aim to measure the dimensions of known objects but to detect prohibited objects or quantities of prohibited materials in substantially random dispositions, shapes and quantities.

The axial rotation systems including computer-assisted tomography or CT (computed tomography) are thus known. This classic method is described in the article "Computed tomography for dimensional metrology" by J. P. Kruth (1) & all, in CIRP Annals.

Volume 60, Issue 2, 2011, Pages 821-842 and implemented for example, by the tomography apparatuses marketed by the companies Werth Messtechnik or General Electric. This method consists in positioning, between an X-ray generating tube and a matrix or linear X-ray image sensor, an object on a turntable around a vertical axis. A very large number (at least 100 and often more than 600) of 2D radiographic images of the objects are acquired during the rotation. If the image sensor is a matrix image sensor, the beam is conical. If the image sensor is linear, the beam is advantageously confined as a fan (fan beam) in a plane orthogonal to the axis of rotation and the rotation is accompanied by a translation along the vertical axis of the rotation, for a full helical-type scan. This technique can provide high-accuracy three-dimensional measurements. However, the acquisition time requires at least one minute for the fastest systems, plus the times of loading and unloading the objects so that 10 to 30 objects are inspected as much as possible per hour.

Another solution called rotary gantry solution is proposed, for example, by the apparatus known under the trade name "speed|scan CT 64" from the General Electric Company. Like some 3D scanners for luggage items, this concept of solution is similar to the medical imaging tomographs in terms of relative movements between source, object and image sensor. Indeed, the manufactured objects or the luggage items, disposed on a conveyor, are in translation in the apparatus. They pass through a projection plane orthogonal to the direction of displacement. In a circular gantry containing said plane, an X-ray source and a generally curved image sensor, opposite to the source, are rotated around the central axis of displacement, in order to obtain, slice by slice or by helical scan, the projections necessary for the 3D reconstruction by an algorithm implementing, for example, the "filtered rear projection" method or the ART method. The objective of these apparatuses is to allow the acquisition of a very large number of projections at each revolution of the gantry, for example 100, even 700 to 1,000 images per slice. The 3D reconstruction of the objects is made, for example, slice by slice. Having indeed determined the attenuation at every point of the slice, by concatenating the slices obtained during the displacement of the object, an attenuation value at every volume element of the object is obtained.

If these vertical axis rotation or rotating gantry apparatuses are very accurate thanks to the large number of provided images, these apparatuses are expensive and slow and are in practice reserved for the off-line check because they are not adapted to the in-line dimensional check for rates that can reach and exceed 600 items per minute traveling at 1 m/s.

Patent application DE 10 2014 103137 describes a method for determining geometric characteristics on a workpiece using a tomodensitometric detector system consisting of an X-ray source, of a plane detector and of a mechanical axis to rotate the piece or to rotate the x-ray source and the detector.

The method acquires radiographic images during the rotation and ensures a representation of the surface by using a model of the surface. Such a method avoids the implementation of volume data reconstruction steps to reduce the calculation time. Such a technique does not allow measuring pieces manufactured at high rate because it requires the loading of a piece on a turntable then a rotation by at least 180° then its unloading to check another piece.

To overcome the drawbacks of the tube and the image sensor embedded on a rotating gantry, patent U.S. Pat. No. 8,971,484 describes a luggage inspection system in which the rotating system is replaced by an array of stationary multi-beam X-ray sources actuated successively to create a virtual displacement of the X-ray sources for providing a large number of radiographic images with different projection angles. Compared to physical rotation systems limited to 4 revolutions per second, the number of "virtual rotations" is increased to 40 revolutions per second. This technique, which is implemented by the apparatus known under the trade name Rapiscan RTT from the company Rapiscan Systems, is able to check 1,200 luggage items per hour, by producing tens of thousands of 2D images of the luggage items, considering that the virtual rotation provides about 40 different projection angles.

This technique turns out to be very expensive due to the high price for the x-ray multi-sources and to the calculation power necessary for the processing of a very large volume of data. In addition, the check rates are still limited and are not adapted to the in-line check.

Patents U.S. Pat. Nos. 7,319,737 and 7,221,732 propose checking luggage items by a technique called digital laminography or tomosynthesis. The luggage items pass through a succession of conical projection planes called fan beam and each containing a pair of linear image sensors disposed in L. These techniques aim to look for weapons or explosives in the luggage items which contain objects of various shapes and materials by displaying their 3D positions in the luggage item and by evaluating, for example, the volume of suspect product. It is common to use multispectral technology in order to also determine the atomic number of the material. These systems therefore seek to determine an attenuation value at every point in the luggage item. On the other hand, these systems are not able to determine at high rate and with accuracy, the dimensions of manufactured objects for the purpose of quality check.

Patent application JP S60 260807 proposes to measure the thickness of the walls of a tube moving in translation along the axis of the tube, using measurements by X-rays derived from one or several focal points to each of which sensors are associated. The focal points and the sensors are positioned to produce radiographic projections along a plane orthogonal to the direction of displacement of the tube. The radiographic projections are therefore coplanar in a projection plane which is orthogonal to the axis of symmetry of the tube. The direction of these radiographic projections forms a right angle (90°) relative to the direction of displacement. This technique does not allow completely knowing the inner and outer surfaces of the tube. The method described by this patent application allows measuring only the cumulative thickness of the two walls of the tube in the direction of projection, without reconstructing a three-dimensional model of a tube which would allow performing accurate measurements in the other directions.

Likewise, patent U.S. Pat. No. 5,864,600 describes a method for determining the filling level of a container using an X-ray source and a sensor disposed transversely on either side of the container transport conveyor. This system does not allow performing measurements for a non-transversely oriented surface because this document does not provide a three-dimensional modeling of the containers.

Patent application US 2009/0262891 describes a system for detecting by X-rays, objects placed in luggage items moved in translation by a conveyor. This system includes pulsed generator tubes or a sensor having a large dimension parallel to the way of travel. This document provides a method for reconstructing the object that is unsatisfactory because the absence of projections in the direction of displacement does not allow the measurement of dimensions in the direction orthogonal to the way of displacement. The lack of radiographic projections in an angular sector does not allow producing a digital model adapted to ensure accurate measurements.

Patent application DE 197 56 697 describes a device having the same drawbacks as patent application US 2009/0262891.

Patent application WO 2010/092368 describes a device for displaying an object moving in translation by X-rays using a radiation source and three linear sensors.

Patent application US 2010/220910 describes a method for detecting anomalies in an object by producing a 3D reference model representing an ideal object. The method then aims to compare an acquired 2D image of an actual object with the 2D image corresponding to the reference model in order to deduce therefrom an anomaly. This method does not allow performing accurate measurements of an object and allows checking an object only in the 2D images produced, therefore only the directions orthogonal to the directions of projection.

Document WO2018014138 describes a method for performing the inspection of a manufactured item. The method consists in acquiring a sequence of radiographic images of the item; determining a three-dimensional position of the shell of the item for each of the acquired radiographic images; and performing a detailed three-dimensional model correction loop in the form of a mesh network, which iteratively comprises: the generation of a simulated radiographic image for each determined position of the item; and the comparison of the simulated radiographic images and the acquired radiographic images and the generation of a match result. If the result of the pairing is indicative of a mismatch, the method comprises the identification of the differences between the simulated radiographic images and the acquired radiographic images and the determination of their cause in terms of material density or three-dimensional geometry; the correction of one among a geometry and a material density of a region of interest of the detailed three-dimensional model of the item based on each of the identified and characterized differences; and the execution of a new iteration. This document therefore works on the basis of a three-dimensional model correction loop, that is to say implementing 3D geometric shapes, which requires significant calculations. In addition, this document teaches that it is necessary to implement, in order to allow this three-dimensional model correction loop, at least about 25 radiographic images and preferably about 100 radiographic images defining a continuous sequence of images, each image providing a unique viewing angle of the item.

The publication by KRUTH J P et al, "*Computed tomography for dimensional metrology*", CIRP ANNALS, vol. 60, no. 2, Dec. 31, 2011, pages 821-842, ISSN: 0007-8506, DOI: 10.1016/J.CIRP.2011.05.0 provides an overview of the technique of X-ray tomography applied to the dimensional metrology. This document indicates in particular that the basic principle of this technology implies that the mathematical reconstruction of the projected images leads to a 3D voxel model, and involves a post-processing of the voxel data, for the detection of the edges of the piece (segmentation) and for the dimensional measurement. This document also indicates that the basic principle of this technology involves the rotation of the object around its axis.

Document US 2009/262891 describes a system which does not perform geometric reconstructions but standard imaging, which requires significant angular sampling and therefore numerous unit sensor components in the direction of the trajectory of the object. This therefore requires planar detectors containing a high density of "photo sites" along lines oriented in the direction of the trajectory of the object. In other words, the 3D reconstruction system using filtered back projection algorithms is very demanding in terms of the total number of unit sensor components, since many unit sensor components are required in the direction of the trajectory of the object.

The object of the invention aims to overcome the drawbacks of the prior art by proposing an inexpensive method to implement and allowing the accurate dimensional X-ray check of manufactured objects traveling in translation at high rate. In particular, the method aims to allow such check with reduced calculation volumes, for reaching these high rates with equipment whose cost remains reasonable.

It is known in tomography that the absence of radiographic projections around a given direction prevents the reconstruction of the surfaces parallel to this direction, creating the "missing boundary" phenomenon, which prohibit for a dimensional check, the measurement of dimensions orthogonal to the missing radiographic projections.

Another object of the invention therefore aims to propose a method that allows performing accurate measurements on objects moved in translation, possibly by constructing an accurate and complete three-dimensional digital model, while the radiographic projections are in limited number and cannot be acquired around the conveying direction of the objects.

DISCLOSURE OF THE INVENTION

The invention relates to a method for automatically measuring linear dimensions of manufactured objects of a series comprising:
  the choice of a series of manufactured objects in which each of said objects consists of one or several distinct parts, the number of parts being known and each part being made of a material with a known attenuation coefficient which is uniform at every point of the part of the object;

the transport, by means of a transport device, of the objects in a direction of displacement along a rectilinear trajectory in a conveying plane, these objects generating a conveying volume during their displacement;

the disposition, outside the conveying volume,
- of at least one focal point of an X-ray generating tube, each focal point being arranged on a same base straight line parallel to the direction of displacement along the rectilinear trajectory, and
- of one or several image sensors each exposed and sensitive to X-rays derived from an associated focal point, these X-rays having passed through at least the region to be inspected producing on each image sensor a radiographic projection of the region to be inspected along a direction of projection;

the acquisition, using the image sensor(s) (Ci, Cik), for each object during its displacement, of a set of one-dimensional processing radiographic images, each one-dimensional processing radiographic image comprising a projection of a section of the object along a section plane (Pk) containing the base straight line, the set comprising:
- said one-dimensional processing radiographic images for a number (NK) of distinct section planes (Pk) containing the base straight line;
- for each distinct section plane (Pk), a number (NP) of said one-dimensional processing radiographic images (Spk) of the region to be inspected, obtained along at least three different directions of projection (Dijk) in the section plane;

for each object to be measured, and for each distinct section plane (Pk), the determination, using the computer system, of a delineation of the object in the considered section plane (Pk), from said one-dimensional processing radiographic images (Spk) of the region to be inspected, obtained along the at least three different directions of projection (Dijk) in the section plane, and the determination, for an object to be measured, from the delineations of the object in each distinct section plane, of at least one measurement of the linear dimension of the region to be inspected of the object to be measured.

Other characteristics of a method according to the invention, which are optional but which can be combined with each other, are developed in the following paragraphs.

A delineation of the object can comprise or be formed by a curve or a set of curves which represent the intersection, with the section plane, of the boundary surfaces of the object.

The curve or each curve of the delineation of the object can be a planar curve modeled by a parametric system.

The determination of a delineation of the object in the section plane can comprise a curve fitting algorithm starting from an a priori delineation of the object in the section plane.

The determination of a delineation of the object in the section plane can comprise a non-linear regression-type curve fitting algorithm.

The determination of a delineation of the object in the section plane can comprise an iterative curve fitting algorithm comprising:
- the consideration of an a priori delineation of the object in the section plane as a calculated delineation of first iteration rank;

then iteratively,
- the calculation, from the calculated delineation of a given iteration rank of the object in the section plane, of a number at least equal to three of simulated one-dimensional radiographic images of the region to be inspected, calculated in the section plane along the at least three different directions of projection which were used for the acquisition of the one-dimensional processing radiographic images in the section plane,
- the comparison of the simulated one-dimensional radiographic images with the one-dimensional processing radiographic images,
- depending on the comparison, the modification of the calculated delineation into a calculated delineation of higher iteration rank, until the comparison of the simulated one-dimensional radiographic images with the one-dimensional processing radiographic images reaches a predefined optimization criterion.

The method can include:
- the acquisition, using the image sensors, for each object during its displacement, of a number at least equal to three two-dimensional radiographic images of the region to be inspected, each obtained along a different direction of projection,
- the extraction, in the two-dimensional radiographic images, of the one-dimensional processing radiographic images to form the set of one-dimensional radiographic images.

A one-dimensional processing radiographic image of an object can be formed by sampling of a point image acquired using a point image sensor, during a scan duration corresponding to the duration of the displacement of the object between the focal point and the point image sensor, during its displacement.

The method can comprise the construction, for an object to be measured, using the computer system and from the delineations of the object in each of the distinct section planes, of a three-dimensional digital geometric model of the region to be inspected comprising:
- three-dimensional points in space each belonging to a boundary surface of the region to be inspected of the object;
- and/or at least one three-dimensional surface of the region to be inspected.

The determination, for an object to be measured, from the delineations of the object in each distinct section plane, of at least one measurement of the linear dimension of the region to be inspected of the object to be measured can comprise the determination of the distance between at least two three-dimensional points of the three-dimensional digital geometric model of the region to be inspected.

The method can comprise the provision to the computer system, for each section plane, of an a priori delineation of the object in the section plane.

The a priori delineations can be obtained by:
- a computer-aided design digital model of the objects of the series;
- and/or from the measurement of one or several objects of the same series by a measuring device;
- and/or from values entered and/or drawings made and/or shapes selected by an operator on a man-machine interface of a computer system.

The method can comprise the provision to the computer system of an a priori three-dimensional geometric model of the region to be inspected of the series, which can be obtained by:

a computer-aided design digital model of the objects of the series;

and/or a digital geometric model obtained from the measurement of one or several objects of the same series by a measuring device;

and/or a digital geometric model generated by a computer system from values entered and/or drawings made and/or shapes selected by an operator on a man-machine interface of the computer system.

The method can comprise the disposition of the focal point(s) in the conveying plane.

The method can comprise the acquisition, using the image sensor(s), for an object of the series during its displacement, and for each considered section plane of the object, of at least two one-dimensional processing radiographic images of the inspected region corresponding to directions of projection defining, in the considered section plane, an effective angle greater than or equal to 45° and less than or equal to 90° and, advantageously greater than or equal to 60° and less than or equal to 90°.

The method can comprise the acquisition, using the image sensor(s), for an object of the series during its displacement, and for each considered section plane of the object, of at least one radiographic image of the inspected region corresponding to a direction of projection having, brought into projection in the conveying plane, an opening angle with the direction of displacement comprised between 10° and 60°.

The method may not comprise the acquisition, using the image sensor(s), for each object of the series during its displacement, of any radiographic image of the inspected region corresponding to a direction of projection having an opening angle with the direction of displacement less than 10°.

The method can comprise the execution and the acquisition of the radiographic projections of the inspected region of an object such that the X-rays derived from the focal point(s) and reaching the image sensors do not pass through another object.

The method can comprise the acquisition, for each object of the series during its displacement and for each section plane, of the one-dimensional processing radiographic images derived from between three and forty radiographic projections of the region to be inspected of different directions of projection, preferably derived from between four and fifteen radiographic projections of the region to be inspected of different directions of projection.

In some embodiments, the image sensors may form part of at least three physical sensor components which are each of linear type, each including a linear array of X-ray sensitive elements distributed along a support straight line, which defines with a focal point, a projection plane containing the direction of projection, these image sensors being disposed such that:

at least m sensitive elements of each of these physical sensor components receive the radiographic projection of the region to be inspected by the X-ray beam derived from a focal point;

the projection planes for the different physical sensor components are distinct from each other and not parallel to the conveying plane;

using each of the at least three linear physical sensor components, at each incremental displacement of each object along the trajectory, one-dimensional radiographic images of the region to be inspected are acquired according to a number chosen such that for each object, the whole region to be inspected is fully represented in the set of the one-dimensional radiographic images;

the at least three sets of one-dimensional radiographic images of the region to be inspected are analyzed for each object.

The invention further relates to an installation for automatically measuring linear dimensions of at least one region to be inspected of manufactured objects of a series, the installation including:

a device for transporting the objects in a direction materialized by a displacement vector, along a rectilinear trajectory in a conveying plane, the objects traveling through an conveying volume extending in the direction of displacement;

at least one focal point of an X-ray generating tube located outside the traversed volume, and creating a divergent X-ray beam directed to pass through at least one region to be inspected of the object, each focal point being arranged on a same base straight line parallel to the direction of displacement along a rectilinear trajectory;

image sensors located outside the conveying volume so as to receive X-rays derived from an associated focal point, the focal point(s) and the image sensors being disposed such that each image sensor receives the radiographic projection of the region to be inspected by the rays derived from the focal point when the object passes through these rays, the directions of projection of these radiographic projections being different from each other;

an acquisition system connected to the image sensors, so as to acquire for each object during its displacement, a set of one-dimensional processing radiographic images, the set comprising:

one-dimensional processing radiographic images for a number of distinct section planes containing the base straight line;

for each distinct section plane, a number of one-dimensional processing radiographic images of the region to be inspected, obtained along at least three different directions of projection in the section plane;

a computer system configured:

for each distinct section plane, to determine a delineation of the object in the considered section plane, from the at least three one-dimensional processing radiographic images.

Other characteristics of an installation according to the invention, which are optional but which can be combined with each other, are developed in the following paragraphs.

The installation can include at least two X-ray-producing focal points, positioned separately in two distinct positions on the same base straight line parallel to the direction of displacement along the rectilinear trajectory, and at least three image sensors, sensitive to X-rays and positioned such that:

each focal point emits its beam through at least the region to be inspected to reach at least one associated sensor;

each sensor is associated with a focal point and receives the X-rays derived from said focal point after having passed through the region to be inspected.

The installation can include at least one focal point from which is derived a divergent X-ray beam with an opening greater than or equal to 90° or at least two focal points from which are derived divergent X-ray beams, the sum of the openings of which is greater than or equal to 90°.

The installation can include at least one focal point disposed in the conveying plane.

At least one focal point and two image sensors can be disposed such that the directions of projection of the inspected region they receive have therebetween an effective angle greater than or equal to 45° and less than or equal to 90° and, advantageously greater than or equal to 60° and less than or equal to 90°.

At least one focal point and one image sensor can be disposed such that, when an object passes through the field of the sensors, the direction of projection of the region inspected on the image sensor forms an opening angle with the direction of displacement comprised between 10° and 60°.

As no focal point of an X-ray generating tube is located in the traversed volume, and no image sensor is located in the conveying volume, the direction of projection of the inspected region on the image sensor never forms an opening angle with the direction of displacement less than 10°.

The image sensors and the focal points are disposed so that the X-rays derived from the focal point(s) and reaching the image sensors and passing through the region of an object do not pass through another object at a time.

The installation can include between one and four focal points, derived from one or several X-ray generating tubes.

The number and the disposition of the image sensors and of the associated focal points are such that, for each object of the series during its displacement, the radiographic projections of the region to be inspected on the image sensors have between three and forty different directions of projection, preferably between four and fifteen different directions of projection.

The image sensors can form part of physical sensor components of linear type each including a linear array of X-ray sensitive elements distributed along a support straight line, which defines with an associated focal point a projection plane containing the direction of projection, these image sensors being disposed such that:
- at least m sensitive elements of each of these physical sensor components receive the radiographic projection of the region to be inspected by the X-ray beam derived from the associated focal point;
- the projection planes for the different sensors are distinct from each other and not parallel to the conveying plane.

In some embodiments, the support straight lines of at least three linear image sensors are parallel to each other.

In some embodiments, the support straight lines of at least three linear physical sensor components are orthogonal to the conveying plane.

BRIEF DESCRIPTION OF THE DRAWINGS

FIG. 1 is a schematic top view showing an installation that allows the X-ray measurement of dimensions on objects traveling in line.

FIG. 2 is a schematic perspective side view showing part of the installation that allows the X-ray measurement of dimensions on an object.

FIG. 3 is a schematic perspective view showing more generally an installation of the type of those of FIGS. 1 and 2.

FIG. 4 is a schematic perspective view showing the volume traversed or generated by the objects during their linear displacement.

FIG. 5 is a schematic top view showing an exemplary embodiment of one installation in accordance with the invention including two X-ray generating focal points.

FIG. 6 is a schematic cross-sectional elevation view of the installation illustrated in FIG. 5.

FIG. 7 is a schematic view explaining the definition of the effective angle between two directions of projection.

FIG. 8 is a schematic view explaining the definition of the effective angle between two directions of projection.

FIG. 9 is a schematic perspective view showing another example of positioning of image sensors relative to the displacement of the objects to be inspected.

FIG. 10 is a schematic view of another exemplary embodiment of an installation in accordance with the invention, implementing matrix image sensors.

FIG. 11 is a view of a matrix of X-ray sensitive elements on which two distinct areas corresponding to two matrix image sensors appear.

FIG. 12 is a flowchart of a method for determining delineation in a section plane.

FIG. 13 is a flowchart of a method according to the invention.

DESCRIPTION OF THE EMBODIMENTS

As a preliminary matter, some definitions of the terms used within the scope of the invention are given below.

A focal point Fj of an X-ray generating tube is a point X-ray source, preferably a "micro focal point", with a diameter for example between 0.01 mm and 1 mm, creating a divergent X-ray beam. It is possible to use any type of point or quasi point X-ray source.

A sensitive element of an image sensor for X-rays is an X-ray sensitive element, in other words an elementary surface, of dimension for example 0.2×0.2 mm or 0.02×0.02 mm converting the X-rays it receives into electrical signal. Generally, a sensitive element of an image sensor for X-rays comprises a scintillator which converts the x-rays into visible light and then a photoelectric sensor which converts the visible light into electrical signal. Techniques of direct conversion of the X-rays into electrical signal also exist. A pixel designates an elementary value of a point of a sampled image, characterized for example by its gray level between 0 and a maximum value. For example for a 12-bit digital image, a pixel assumes digital values between 0 and 4,095.

A system for reading or acquiring radiographic images includes one or several X-ray sensitive surfaces that is to say surfaces comprising one or several sensitive elements converting the X-rays into electrical signal to be transmitted to an analysis system, conventionally implemented by a computer and designated by a computer system SI in the remainder of the description. The signals derived from a set of sensitive elements belonging to the same sensitive surface area, acquired by the acquisition device and transmitted together to the computer system, constitute a radiographic image. In order to be analyzed by the computer system, the radiographic images are preferably converted into digital radiographic images either as close as possible to the sensitive surface, for example in an electronic circuit integrated into a physical sensor component including the sensitive area, or remotely, for example as close as possible to the computer system SI, or by the computer system SI.

The computer system SI, an example of which is symbolically illustrated in FIG. 3, can be made in the form of at least one standard computer, therefore including at least one microprocessor, one or several electronic memory units and one or several display (screen, projector, holographic display, etc.), input (keyboard, mouse, touch pad, touch screen, etc.), and/or communication (USB, Ethernet®, Wi-Fi®, Bluetooth®, Zigbee®, etc.) interface(s). The computer system can comprise a computer network sharing data with one or several other computers of the network, or with other networks, for example by an internet or Ethernet® protocol. In addition to its obvious connection to the image sensors, the computer system can be connected to sensors giving information on the state of the installation, and/or to actuators of the installation (conveyors, ejectors, etc.). The computer system can advantageously be connected to the X-ray tube(s) in order to acquire operating data therefrom and/or to ensure the checking thereof. The computer system implements one or several software stored and/or executed locally or remotely, including on one or several remote computer servers. This or these software preferably comprise one or several software programmed to implement the method according to the invention.

The X-ray beams derived from a focal point Fj pass through at least one inspected region, and form, on a sensitive surface, the radiographic projection of the inspected region, which is sometimes called radiant image and which contains the information on the attenuation of the X-rays by the traversed material.

Image sensor Ci, Cik refers to an X-ray sensitive surface area which receives the radiographic projection of the inspected region. An image sensor Ci, Cik is exposed to the X-rays derived from an associated focal point Fj. The image sensor converts this radiographic projection into a radiographic image of the inspected region.

When the sensitive surface area corresponding to an image sensor Ci contains a single line of photosensitive elements distributed along a support straight line segment, the radiographic image acquired in an integration time (also called acquisition time) of the sensor is linear, therefore one-dimensional, composed of a line of pixels forming a one-dimensional value table. The image sensor Cik is then called linear sensor. A sensitive surface area containing a single line of sensitive elements, which constitutes a linear image sensor, therefore includes a linear array of sensitive elements distributed along a support straight line segment. According to this definition, a column or a row or any set of aligned sensitive elements (including along a diagonal or another inclined line) belonging to a sensitive matrix surface, is considered as a linear image sensor. Several sensitive surface areas of the same surface and each containing a single line of sensitive elements, the lines of the different areas being different, therefore constitute several linear image sensors.

When the sensitive surface area corresponding to an image sensor Ci contains a two-dimensional matrix of photosensitive elements, the radiographic image acquired in an integration time of the sensor is a matrix therefore two-dimensional image composed of a matrix of pixels forming a two-dimensional value table. The image sensor Ci is then called a two-dimensional sensor or a matrix sensor.

When the sensitive surface area corresponding to an image sensor Cik contains a single photosensitive element, the radiographic image acquired in an integration time of the sensor is called point image, composed of a pixel having a single value, The image sensor Cik is then called point sensor.

Within the scope of the present invention, an image sensor Ci, Cik can correspond to a physical sensor component CC1, CC2, ..., CCnmax, to part of a physical sensor component CC1, CC2, ..., CCnmax, or to the assembly of several physical sensor components or parts of physical sensor components. A physical sensor component is a component including one or several sensitive elements, secured to each other if there are numerous, and including, for all of its sensitive elements, a common connection interface with a computer system. The common connection interface can be analog or digital. The common connection interface forms generally part of an integrated electronic circuit of the physical sensor component. In a physical sensor component CC1, CC2, ..., CCnmax including several sensitive elements Cik, the sensitive elements are arranged along a line or along a fixed surface, not modifiable, generally planar, but sometimes curved. When the physical sensor component CC1, CC2, ..., CCnmax contains a line of photosensitive elements, it is called linear sensor component. When the physical sensor component contains a two-dimensional matrix of photosensitive elements, it is called two-dimensional or matrix sensor component. When the physical sensor component contains a single photosensitive element, it is called point sensor component.

Within the scope of the present invention, it is therefore understood that an image sensor Ci, Cik is a set of one or several sensitive elements Cik converting the X-rays into an electrical signal, the sensitive elements being physical elements. This set of physical sensitive elements can correspond to a physical sensor component CC1, CC2, ..., CCnmax, or not.

In the invention, it will be possible to distinguish the radiographic images acquired by a physical sensor component CC1, CC2, ..., CCnmax, and the processing radiographic images used by the computer system for the calculation of the delineations, which can correspond to a radiographic image acquired by a physical sensor component, to part of a radiographic image acquired by a physical sensor component, or to the assembly of several images or parts of radiographic images acquired by one or several physical sensor components. In particular, a one-dimensional processing radiographic image of an object can be formed by sampling of a point image acquired using a unique given sensitive element Cik during a scan duration corresponding to the duration of the displacement of the object between the focal point and the sensitive element, during its displacement. This sensitive element Cik can correspond to a point physical sensor component, or belong to a linear physical sensor component or to a two-dimensional or matrix physical sensor component. Similarly, a two-dimensional processing radiographic image of an object can be formed by sampling of a linear image acquired using a linear image sensor Cik, during a scan duration corresponding to the duration of the displacement of the object between the focal point and the linear sensor, during its displacement. This linear image sensor Cik can correspond to a linear physical sensor component or belong to a two-dimensional or matrix physical sensor component. An image formed by sampling corresponds to the juxtaposition of several images acquired successively over time. For a radiographic image, the direction of projection Dji, Djik is the oriented direction or the vector, starting from the focal point Fj to pass through the center of the image sensor Ci, Cik implemented to acquire the image, that is to say through the center of an area sensitive to X-rays which receives the radiographic projection of the region inspected at the time of acquisition during the displacement of the object between the focal point and the image sensor. For an associated image sensor-focal point pair, the direction of projection is the vector derived from the focal point reaching the middle of the image sensor. The positioning of the image sensors is such that the sensitive surface is not parallel to the direction of projection. It may be advantageous in some cases that the sensitive surface of the image sensor is orthogonal to the direction of projection defined with the associated focal point. But this is not mandatory, for example if a sensitive surface of the same physical sensor component contains several sensitive areas each forming an image sensor and which cooperate for each image capture, each with a different focal point, therefore along different directions of projection.

For a one-dimensional processing radiographic image of an object which would be formed by sampling of a point image acquired using a sensitive element $C_{ik}$ during a scan duration corresponding to the duration of the displacement of the object between the focal point and the sensitive element, during its displacement, the direction of projection $D_{jik}$ therefore corresponds to the oriented direction starting from the focal point $F_j$ to pass through the center of the implemented sensitive element.

For a one-dimensional processing radiographic image of an object, acquired using a linear image sensor $C_{ik}$ during a single integration time of the sensor, the direction of projection therefore corresponds to the oriented direction starting from the focal point $F_j$ to pass through the center of the implemented linear image sensor $C_{ik}$. The direction of projection $D_{jik}$ associated with the linear processing radiographic image obtained is therefore the direction starting from the focal point and passing through the middle of the support straight line segment of the linear image sensor $C_{ik}$, at the time of acquisition of the image corresponding to the integration time of this linear image sensor $C_{ik}$.

For a two-dimensional processing radiographic image of an object formed by sampling of a linear image, the linear image being acquired using a linear image sensor $CC_i$ during a scan duration corresponding to the duration of the displacement of the object between the focal point and the linear image sensor, during its displacement, the direction of projection $D_{ji}$ therefore corresponds to the oriented direction starting from the focal point $F_j$ to pass through the center of the implemented linear image sensor.

For a two-dimensional radiographic image of an object, acquired using a two-dimensional image sensor $C_i$, $CC_i$ during a single integration time of the sensor, the direction of projection $D_{ji}$ therefore corresponds to the oriented direction starting from the focal point $F_j$ to pass through the center of the implemented two-dimensional image sensor.

The directions of projection $D_{ji}$, $D_{jik}$ of radiographic projections are considered as being different if the directions of projection $D_{ji}$, $D_{jik}$ taken in pairs form together a minimum angle at least equal to 3 angle degrees, preferably at least equal to 5 angle degrees.

A sensitive surface area that contains a matrix of sensitive elements constitutes a matrix or two-dimensional image sensor, which includes a matrix array of X-ray sensitive elements distributed in a matrix. As illustrated in FIG. 10, according to this definition, a sensitive matrix surface area C1, C1', which belongs to a larger sensitive surface Ss, is also a matrix image sensor. In this example of FIG. 10, the sensitive surface Ss corresponds to the sensitive surface of a matrix physical sensor component CC1. Several sensitive matrix surface areas C1, C1' of the same surface can, in some cases, be processed separately by the acquisition device. In any case, they constitute therefore several matrix image sensors providing different matrix radiographic images respectively M1, M1' (FIG. 12). The direction D11, D11' of projection associated with the matrix radiographic image respectively M1, M1' is the direction starting from the focal point F1 and passing through the middle of the sensitive matrix surface area C1, C1', at the time of acquisition of the image. It is therefore possible that the image sensors C1, C1' are non-disjoint regions, possibly activated successively in time.

Of course, those skilled in the art can use a technology of physical matrix sensor component based on a brightness amplifier or a "screen capture camera" in which a scintillator plate receives the radiant image, converts it into visible light, the image visible at the rear of the scintillator being photographed by a sensitive camera in the emission range of the scintillator, generally the visible range, and provided if necessary with an objective lens.

The invention applies to series of manufactured objects composed of one or several material(s), such as objects obtained by machining, molding, blowing, sintering, injection, extrusion or assembly of objects obtained by these types of methods, each of said objects being made up of one or several distinct parts, the number of parts being known and each part being made of a material whose attenuation coefficient µ is known and uniform, that is to say having the same value at every point of the considered part of a region to be inspected of the object and preferably constant over time and identical for the objects of the series.

In some embodiments, for example mechanical pieces of steel or aluminum foundry, glass bottles, plastic packaging, these may be objects called mono-material objects. In this case, the attenuation coefficient µ is known and uniform, that is to say having the same value at every point of a region to be inspected of the object. However, the invention can be implemented for multi-material objects. In some cases, the different materials have an equal attenuation coefficient, so that the subdivision of the object into different parts can be ignored and the object can be considered as if it were a mono-material object, provided that the attenuation coefficient is uniform, in the sense of uniform over the whole inspected region.

However, the invention can also be implemented for the measurement of linear dimensions for multi-material objects. Such an object is therefore considered as consisting of an assembly of volumes homogeneous in composition, each volume homogeneous in composition being considered as part of the object. These volumes, or parts of the object, are delimited by closed surfaces. For the invention, it will be considered that the number of these parts is known, at least for the region to be inspected of the object. This number is countable for the inspected region, preferably low, for example less than 50, preferably less than 20, more preferably less than 10, in order to limit the importance of the calculations and to preserve convergence in case of use of an iterative adjustment method.

Preferably, the topology of these parts of the object is known, namely particularly the relative dispositions of relatedness (existence of common surfaces, situations of inclusion or exclusion of the different parts therebetween, juxtapositions and relative positions, existence of common surfaces, etc.). This amounts to saying that it can be considered that an X-ray passing through the object has passed through a finite number of volumes having different but known attenuation coefficients, therefore that the path can be broken down into segments, each segment joining two points belonging to boundary surfaces of part of the object, traveling through a region of constant attenuation, even if the length of these segments is not known a priori. The attenuation of each x-ray depends only on the length of the traversed successive segments and on the attenuation for each segment. Consequently, the information on each radiographic image point is directly related to the actual dimensions of the inspected region whose structure is known. In addition, the geometry of the object, and in particular the geometry of its different parts, can be described by computer a priori (before the measurement) by a representation made up of a set of closed surfaces, which can be called boundary surfaces of the object. The boundary surfaces of an object are the interface surfaces. It is thus possible to have one or several outer boundary surfaces of the object, which are each an interface between the surrounding air and the material of part of the object. It is also possible to have one or several inner boundary surfaces of the object, which are each an interface between the two materials of two juxtaposed parts of the object. In the case of a hollow object including an internal cavity delimited by an internal surface of the object, the internal surface is an outer boundary surface of the object because it is the interface between the material of the object and the surrounding air, even in the case of a closed cavity in which the surrounding air would be trapped.

It should be noted that the attenuation coefficient µ of a material is strictly speaking a spectral property µ(λ) depending on the wavelength λ or the energy of the X-rays. This characteristic is not necessarily taken into account insofar as, the X-ray source having its own emitted spectral composition, it is possible to consider that the attenuation µ is a characteristic of the material for the spectrum of the chosen source. Those skilled in the art will also know how to carry out the invention by using any method for taking into account the spectral or hardening attenuation of the beams.

Of course, local and/or temporal variations of the low-amplitude attenuation coefficient µ do not prevent the implementation of the method, but could possibly, depending on their amplitude, cause slight or significant losses of accuracy in the measurements performed by the installation. It is therefore considered that such small variations, due for example to variations in the composition of the objects, variations in parameters of the manufacturing method, modifications in the environmental conditions, or changes in the operation of the X-ray sources, are possible while considering the uniqueness and the constancy of the attenuation of the material in each part of the object as verified. On the other hand, the invention does not apply to heterogeneous parts of objects such as conglomerates of coarse grain size, mortars with pebbles as long as the heterogeneous grains and attenuations are larger than the resolution of the images. The invention does not apply to checks of objects of shape and content that are unknown in advance, such as luggage items. For the same reasons, the invention does not apply to medical or biological imaging in general, except for objects meeting the criteria.

The attenuation of air can be considered negligible compared to that of the material(s). In this case, the attenuation of an x-ray beam passing through the object will only depend, on the one hand, on said uniform attenuation for the emitted x-ray spectrum, and on the other hand, on the cumulative material thickness traversed. Alternatively, it is considered that the traversed air thickness is large and uniform for all the rays, therefore it can be considered as known. The attenuation due to air can be subtracted from the total measured attenuation. Thus, it can for example be considered that the gray level in each radiographic image, possibly corrected, depends only and directly on the total cumulative material thickness traversed. It is then possible to accurately determine boundary surfaces which are the transitions between air and material.

The digital analysis of the radiographic images of an object therefore allows knowing the relative position in space of a certain number of points of the boundary surfaces of the object.

The digital analysis of the radiographic images of each object allows possibly constructing a three-dimensional digital geometric model of each object, referred to as a digital geometric model in the remainder of the description. Optionally, this digital geometric model can simply be a stack of two-dimensional digital geometric models. The production of a digital geometric model is how—in mathematical, graphical and data structure terms—three-dimensional objects are represented and handled in digital form in a memory of a computer system. It should be considered that the invention, in some of these embodiments, allows determining as many three-dimensional digital geometric models as there are radiographic objects, and that there may be as many radiographic objects as the number of objects traveling on the transport system. Indeed, a characteristic of the invention is that it allows, if necessary, performing a measurement on each of the objects circulating in the installation, including at high rate.

It is possible to obtain a surface model directly from the radiographic images, that is to say without going through the calculation of a volume model.

In the surface modeling, an object is defined by at least one three-dimensional surface, in particular a closed three-dimensional oriented surface corresponding to the outer boundary surface between the material of the object and the external environment (generally air), which allows understanding the concepts of interior and exterior of the object. Different modeling is possible for such surfaces: implicit surfaces, parameterized surfaces (plane parts, B-spline, NURBS, etc.), possibly limited by an array of curves. A simple modeling is the triangular mesh, which can be seen as boundary surface of a volume formed by tetrahedra.

A section of a three-dimensional object that is to say the intersection of the object with a section plane, allows defining a delineation of the object in the section plane. The section of the three-dimensional surfaces of the object, and therefore of its boundary surfaces, determine one or several two-dimensional curves in the section plane which, taken together, form the delineation of the object in the section plane. The knowledge of these two-dimensional curves in a succession of cutting planes allows the reconstruction of the three-dimensional surfaces, with an accuracy that of course depends on the number of section planes.

In order to perform measurements of linear dimensions such as lengths, there are several approaches.

In a method, called surface method, it is possible to calculate a segment whose ends are the intersections of a straight line with the material/air boundary surface of a surface model. Finally, a mixed method consists in transforming the volume model into a surface model, then in applying the second method.

A third method consists in determining in a cutting plane, the distance between two points of one or two two-dimensional curves, any curve being a boundary between the material and air.

A three-dimensional point is a point whose coordinates in the three-dimensional space are known, in any reference frame.

These three previous methods are examples of determination of a distance between two three-dimensional points, to determine a linear dimension measurement.

One objective of the invention is to perform measurements more complete than those made possible by simple two-dimensional radiographic images. Indeed, it is easy, using a matrix image sensor, to obtain a two-dimensional radiographic image corresponding to a projection of the inspected region and to measure dimensions in a plane orthogonal to the direction of projection called "projected plane". Likewise, it is easy, using a linear image sensor, to obtain a two-dimensional radiographic image corresponding to a projection of the inspected region obtained by juxtaposition of the successive image lines acquired during the displacement in the direction of displacement, and to measure dimensions in a projected plane, which is parallel to the direction of displacement. On the other hand, according to the invention, linear dimensions can be measured along directions which are neither contained in the projected planes, nor parallel to the projected planes. The method according to the invention can indeed include, during the processing of a combination of the radiographic images along at least three different directions of projection, the reconstruction and the measurement of the dimensions along virtually all directions. This is possible by any method that allows the determination of three-dimensional points in space belonging to a boundary surface included in the region to be inspected of the object. The reconstruction of a three-dimensional model of the region to be inspected, of the surface or volume type or based on cutting planes, is one possible method. Indeed, it is possible, indirectly from a three-dimensional volume model of the region to be inspected, and preferably from a three-dimensional surface model of the region to be inspected, possibly by determining cuts of the three-dimensional model of the region, to determine at least two three-dimensional points, even preferably three-dimensional point clouds, distributed along directions that cannot be measured from the only two-dimensional radiographic images.

A digital geometric model is therefore made up of geometric elements such as points, segments, curves, surfaces, calculated from radiographic projections by considering, to calculate each element, the attenuation of at least some X-rays having passed through this point on the actual object, with the aim that the digital geometric model is a faithful representation of the geometry of the actual object, including deformations relative to an ideal object. In other words, the coordinates of the geometric elements are determined by considering that said coordinates have modified the radiographic projections, even when these geometric elements are not distinguishable in any of the 2D radiographic projections. The measurements of dimensions on the digital geometric model therefore give information on the dimensions of each modeled object, from geometric elements that are not distinguishable in any of the radiographic projections.

Consequently, one advantage of the method according to the invention is that it allows determining, for each object, a digital geometric model consisting of at least two three-dimensional points, each of these two points belonging to a boundary surface of the region to be inspected and this even if these two points are not located in a plane orthogonal to a direction of projection Dji, Djik, nor in a plane parallel to the direction of displacement.

Of course, the interest of the method is not only to provide measurements in directions outside a plane orthogonal to a direction of projection Dji, Djik, and outside a plane parallel to the direction of displacement, but also to provide a large number of measurements distributed in the inspected region, hence dimensions in many directions, between multiple pairs of points. Preferably, a digital geometric model is made up:

of at least two three-dimensional points in space each belonging to a boundary surface of the region to be inspected and not located in a plane orthogonal to a direction of projection Dji, Djik, and not located in a plane parallel to the direction of displacement T;

and/or of at least one three-dimensional surface of the region to be inspected, containing points not belonging to a plane orthogonal to a direction of projection Dji, Djik, and not belonging to a plane parallel to the direction of displacement T;

and/or of at least one section of the region to be inspected, along a plane different from a plane orthogonal to a direction of projection Dji, Djik and different from a plane parallel to the direction of displacement.

A geometric model called "a priori" geometric model is a digital geometric model of the series of objects, able to serve as an initialization for reconstruction software in order to construct a digital geometric model of the object. Its role is then mainly to provide the computer system with information on the shape, geometry and dimensions of the object and/or the different parts of the object to be modeled by calculation, this information being however insufficiently precise to allow a measurement of the object with the accuracy required for the measurement.

Thanks to this information it becomes in particular possible:

not to model, from the radiographic images, the attenuation in regions of the image space empty of material a priori because the attenuation is considered therein as zero;

and/or to model, from the radiographic images, only the surfaces on which the measurements of dimensions are to be performed;

and/or to determine only the deviations between the modeled surfaces from the radiographic images and the theoretical ideal surfaces.

In the case of mono-material objects, the knowledge of the a priori geometric model also allows not determining, from the radiographic images, attenuation values in regions of the space of the image containing material according to the a priori model because it is known as that of the manufacturing material of the object.

However, it should be understood that according to the invention, no measurement of an object is deduced from a measurement on the a priori geometric model, since this model is known independently of said object and represents a non-actual theoretical ideal object.

As seen from the drawings and more specifically from FIGS. 1 and 2, the object of the invention relates to an installation 1 allowing the implementation of a method for automatically performing measurements of linear dimensions on manufactured objects 2 moving by traveling at high speed. The invention relates to a check called "in-line" check of a series of manufactured objects, the objects of a series being supposed to be identical, after a transformation or manufacturing step, in order to check the quality of the objects or of the transformation or manufacturing method. The objects are supposed to be identical insofar as no intentional action is taken to make them differ. However, it is well known that, in a series, all the objects are not the identical, due to hazards in transformation or in manufacture.

The method operates for a traveling rate of an object flow 2. Ideally, the installation 1 is capable of processing the production at the production rate, for example at more than 100 objects per minute, preferably more than 300 objects per minute, and for example at a rate of at least 600 objects per minute.

However, the calculation duration may exceed the interval between two objects. Likewise, the exposure times, also called integration times, of the image and reading sensors may be too long. If the fastest flow cannot be handled by a single installation in accordance with the invention, then several installations can be implemented in parallel, each checking part of the production. Thus, it is possible to divide the production flow into two or three parallel flows inspected by two or three installations according to the invention. Obviously, the economic interest of the invention is increased if the number of flows and therefore of installations according to the invention remains low.

The invention brings a considerable improvement thanks to the measurement of traveling objects, by avoiding the helical scan and the scan on a turntable which are not adapted to the production rates because these two modalities, implying a relative rotation of the objects with respect to the focal points and/or to the sensors, create a "rupture in the travel" of the objects or a very slow displacement of the objects within the installation.

The method according to the invention ensures the measurement, preferably on each object 2, of at least one and generally of several linear dimensions, that is to say lengths. A linear dimension is indeed a length measured along a line. This line along which the linear dimension is measured can be a rectilinear line, or a non-rectilinear line, for example any curved line, a circular line, a broken line, etc. This line can be a flat line, contained in a plane, or a three-dimensional line which is not comprised in a plane. A length is a measurement expressed in units of length, for example in inches or in meters. A linear dimension of a manufactured object is for example a diameter, a thickness, a height, a length, a width, a depth, a distance, coordinated as a distance of a point from an origin, a perimeter of the manufactured object. At least one linear measurement of the inspected region is the distance between at least two three-dimensional points each belonging to a boundary surface, in particular an outer boundary surface, of the region to be inspected and located in a plane, including a plane not orthogonal to a direction of projection Dji, Djik.

According to the invention, the objects 2 are supposed to be identical objects, apart from the dimensional variations, forming a series of objects. In other words, a series is made up of theoretically identical objects when they are conformal. The dimensional check consists in measuring actual dimensions and comparing them with the required dimensions. A priori, any object of a series is close to an ideal reference object with the required dimensions but deviates therefrom by dimensional variations.

According to one advantageous characteristic of embodiment, at least one region of the object 2 is chosen to be inspected so as to be able to perform measurements of dimensions in this region of the object, corresponding to a dimensional characteristic of the region to be inspected. At least the region of the object in which the linear dimension(s) is/are to be measured is inspected by X-rays. Thus, the inspected region can correspond to the entire object or to one or several regions of that object.

As indicated, all the objects 2 of a series consist of a single part, or of several distinct parts, each part being made of a material having a uniform attenuation coefficient at every point of the considered part of the object.

According to one advantageous variant of the invention, for each part of the region to be inspected, this coefficient is known by the computer system. The method can provide a means for making available to the computer system the value of the attenuation coefficient of the material. This value can be spectral, in the sense of a value which is a property of the material, which defines the interaction of this material with a radiation and which depends on the wavelength of the radiation. This value may be non-spectral, in the sense of independent of the wavelength of the radiation. This value can be made dependent on the settings of the X-ray sources. The provisioning is possible by different input, communication and memory devices. For example, the device for making available to the computer system the value of the attenuation coefficient of the material is a mass memory, a wired or wireless computer network or a man/machine interface.

The installation 1 also includes a device 5 for transporting the objects 2 in a conveying plane PC, that is to say along a flat trajectory, with a direction materialized by a vector of displacement T. Preferably, the trajectory is rectilinear, within the limits usually allowed for the straightness of a conveying line. Conventionally, the transport device 5 is a web or chain conveyor ensuring linear translation of the objects 2 which are deposited therein. Thus, the objects 2 of the same series are essentially in translational movement in the conveying plane PC. As seen more specifically in FIGS. 1 and 2, for the convenience of this description, it is conventionally assumed that the direction of displacement of the objects 2 is established along a horizontal axis X of a reference frame X, Y, Z including a vertical axis Z perpendicular to the horizontal axis X and a transverse axis Y perpendicular to the vertical axis Z and to the horizontal axis X, and X and Y being in a plane parallel to the conveying plane PC which is preferably, but not necessarily, horizontal.

The position of the objects considered in a moving orthonormal reference frame in translation along the direction T is fixed during their displacement and the acquisition of the radiographic images. This fixed position implies in particular an absence of rotation of the object in a moving orthonormal reference frame in translation along the direction T, in particular for example an absence of rotation of the object around a possible axis of symmetry of the object. For example, the objects are deposited on the conveyor band, bearing stably, possibly on a clean placement plane such as the base of a container or the legs of a seat.

In one variant of the invention, it is possible to provide a support for the objects 2. In this case, this support is fixed in the moving orthonormal reference frame, in translation along the direction T, and it maintains the object also fixed in the moving orthonormal reference frame in translation along the direction T. So that the support does not influence the measurements, according to a first variant, it is excluded from the inspected region so as not to appear in superposition of the inspected region in the projections. According to a second variant, its attenuation coefficient is negligible relative to that of the objects and can be assimilated to air or to zero attenuation. According to a third less advantageous variant, the geometry of the support, as well as its position in the moving reference frame, are precisely known and repeatable for the series of objects and its attenuation coefficient is precisely known and is stable, and preferably identical to that of the objects of the series of objects, so that the support is taken into account in the reconstruction and isolated from the geometric model of the object.

The position of the objects being stable (during the scrolling and the acquisition of the radiographs), it remains preferable that this position in the moving orthonormal reference frame in translation along the direction T is also the same for each object of a series of objects.

If this is not the case, it is then possible, according to a variant of the invention, to implement a means for determining the position of each object in the moving orthonormal reference frame in translation along the direction T relative to a common reference mark of the installation, this position being taken into account, for example by the means for calculating the delineation of the object along section planes which will be described later. This preliminary step consists in determining the position of each object. It can comprise the matching, in a virtual reference frame, of the images acquired with a priori delineations of the object, which can for example be derived from an a priori geometric model. This amounts in all cases to determining the delineations of the objects, and possibly a 3D model of the objects which would be drawn therefrom, in the moving orthonormal reference frame in translation along the direction T.

On the other hand, it is understood that, if the position of the objects is stable in the moving orthonormal reference frame in translation along the direction T during the scrolling and the acquisition of the radiographs, it is not necessary to determine the position of each object relative to a common reference frame of the installation.

As seen more specifically in FIG. 4, during their translational displacement, the objects 2 generate or pass through a volume called conveying volume Vt. The plane PS is the secant plane of the conveying volume Vt, orthogonal to the conveying plane PC and parallel to the direction of displacement T. For example, the plane PS can be a median plane which separates the conveying volume Vt into two equal sub-volumes. The secant plane PS is a vertical plane in the case where the conveying plane is horizontal.

The installation 1 also includes, as illustrated in FIGS. 1 and 2, at least one focal point Fj (with j varying from 1 to NF) of an X-ray generating tube 7 creating a divergent X-ray beam directed to pass through the conveying volume Vt and more specifically pass through at least the region to be inspected of the object 2. In the variants in which the installation includes several focal points Fj, as illustrated in FIGS. 5 and 6, all the focal points which will be used for the method according to the invention will be arranged on the same base straight line B, parallel to the direction of displacement T along the rectilinear trajectory. This does not prevent the possible presence of one or several auxiliary focal points (not represented) which could be used for the acquisition of other images.

The installation 1 also includes image sensors Ci, Cik (with i varying from 1 to N and N being, in some cases, able to be greater than or equal to 3) sensitive to X-rays and located so as to be exposed to X-rays derived from a focal point Fj and having passed through the conveying volume Vt and more specifically, at least the region to be inspected of the object 2. Of course, the tube(s) 7 and the image sensors Ci, Cik are located outside the conveying volume Vt to allow the free displacement of the objects in this volume. Conventionally, the X-ray generating tubes 7 and the image sensors Ci, Cik are placed in an X-ray proof enclosure.

In some embodiments, an image sensor Ci, Cik is associated with a single focal point Fj in the sense that, in the implementation of the method, this image sensor Ci is provided so that the images it delivers and which are taken into account in the method are formed only of rays derived from the associated focal point Fj. For example, the installation can be provided so that only rays derived from a given focal point can reach the associated image sensor, for example by the disposition of absorbing masks in a suitable manner. According to another example, which can be combined with the previous one, it can be provided that the acquisition of images by an image sensor is only triggered when only the single associated focal point is activated.

However, in some embodiments, several image sensors can be associated with the same focal point Fj, and/or several focal points Fj can be associated with the same image sensor. In one preferred embodiment, several image sensors are associated with the same focal point Fj.

As indicated above, an image sensor Ci, Cik corresponds to a physical sensor component CC1, CC2, . . . , CCnmax, . . . , to a part of a physical sensor component or the assembly of several parts of one or several physical sensor components.

The X-ray beams derived from a focal point Fj pass through at least the inspected region, and form, on an image sensor, a radiographic projection of the inspected region, along a direction of projection Dji, Djik (FIGS. 1 and 2). The direction of projection Dji, Djik is the oriented direction of the vector starting from the focal point Fj to pass through the center of the image sensor Ci, Cik implemented for the acquisition. The focal point(s) Fj and the image sensors Ci, Cik are disposed such that each image sensor receives the radiographic projection of the region to be inspected along the direction of projection.

The installation 1 also includes an acquisition system connected to the image sensors Ci, Cik, so as to acquire, for each object 2 during its displacement, a set of one-dimensional processing radiographic images of the object, in which each one-dimensional processing radiographic image comprises a projection of a section of the object along a section plane Pk containing the base straight line B. More specifically, this set of images comprises:

such one-dimensional processing radiographic images for a number NK of distinct section planes Pk containing the base straight line;

for each distinct section plane Pk, a number NP of such one-dimensional processing radiographic images Spk, Sp'k, Sp"k, . . . , of the region to be inspected, obtained along at least three different directions of projection Djik in the section plane Pk.

This set of images therefore includes, for each section plane Pk in a plurality of section planes containing the base straight line, at least three one-dimensional processing radiographic images Spk of the region to be inspected of the object, which are each obtained along a different direction of projection Djik in the section plane Pk.

FIG. 2 illustrates the mark of several distinct section planes Pk, Pk' containing the base straight line B and therefore containing the focal point Fj. It is noted that, in embodiments including several distinct focal points Fj, since these focal points are placed on the same base straight line B, a given section plane Pk, Pk', Pk", . . . , contains all the focal points Fj. It is noted that the distinct section planes Pk, Pk', . . . , are by definition not parallel to each other, but arranged in a fan shape around the base straight line B. The base straight line B is therefore the intersection of all the section planes Pk, together constituting a family of planes.

A section plane Pk is therefore defined by the base straight line B, and by at least one sensitive element Cik, Ci'k, Ci"k, . . . , of an image sensor, contained in this section plane Pk. and/or, as in the example of FIG. 9, by a linear image sensor Cik, Ci'k, Ci"k, . . . , contained in this section plane Pk. In the case of a linear sensor, it can be oriented parallel to the base straight line B, or be oriented along a direction which intersects the base straight line B. The base straight line B being fixed for the installation, the section plane Pk is therefore associated with this sensitive element Cik contained in the section plane Pk, or with this linear image sensor Cik contained in the section plane Pk. For at least some of the section planes Pk, the section plane could therefore cut the object 2.

The intersection of a section plane Pk with the object 2 defines a section of the object 2. As seen above, each section plane Pk defines, at its intersection with the object, a delineation of the object 2 in the section plane, the delineation being formed by one or several two-dimensional curves, considered together in the section plane.

It is observed that there is only one section plane Pk parallel to the conveying plane PC. It has been seen above that the conveying plane is considered, at least in some embodiments, to be horizontal. In some applications of the invention, the series of objects can be a series of containers, in particular bottles, particularly glass bottles. For these containers, it is generally observed that they have a central axis along which their general shape is elongated, this central axis possibly being, for some bottles, an axis of symmetry, or even an axis of symmetry of revolution. Usually, such objects are transported with their central axis in a vertical position. It follows that the different section planes Pk each intersect the object by forming a different angle with the central axis of the object. Within the scope of an object which would have mainly a shell or outer surface of cylindrical shape of revolution, the section planes Pk then cut the object such that the outer contour of the object appears in the form of an elliptical curve.

The section plane Pk furthermore defines a projection of this section of the object on an associated sensitive element Cik contained in the plane Pk, or on a linear image sensor Cik oriented parallel to the base straight line B and contained in the plane Pk.

In operation, the sensitive element Cik which is intersected by the plane Pk, or the linear image sensor Cik which is intersected by the plane Pk, allows obtaining a one-dimensional radiographic image Spk of a projection of this section along this section plane.

In both cases, whether it is acquired directly by a linear image sensor, or acquired indirectly by sampling with a single sensitive element, this one-dimensional radiographic image will be used for the processing according to the invention and will therefore be qualified as one-dimensional processing radiographic image.

In the case illustrated in the examples of FIGS. 2, 3 and 5 where a single sensitive element Cik is implemented to acquire this one-dimensional processing radiographic image, it is necessary to form it by sampling of a point image acquired using a sensitive element Cik, during a scan duration corresponding to the duration of the displacement of the object between the focal point and the sensitive element Cik, during its displacement, therefore by juxtaposition of several images acquired successively over time, during the scan duration, by the implemented sensitive element Cik, which forms a point image sensor. It is then noted that, each image acquired successively over time by the implemented point image sensor Cik is a pixel of the one-dimensional processing radiographic image. The time between two point images, acquired successively by the implemented point image sensor Cik, corresponds to an incremental displacement of the object along the trajectory of displacement. The scan duration therefore corresponds to the time necessary so that the entire section of the object by the section plane Pk passes through the line which supports the direction of projection. It is also noted that, in this case, each pixel is obtained with a strictly identical direction of projection, corresponding to the direction of the vector joining the focal point Fj to the sensitive element Cik, since all the pixels of the processing radiographic image are obtained by the same sensitive element Cik, with only a time shift.

In the case illustrated in FIG. 9 where a linear image sensor Cik is implemented to acquire this one-dimensional processing radiographic image, it can be acquired in a single acquisition time or integration time of the sensor. The one-dimensional linear processing radiographic image then corresponds to the simultaneous acquisition of several point images each delivered by a sensitive element belonging to a set of sensitive elements aligned consecutively on a straight line contained in the section plane Pk. It is then noted that, in this case, each pixel of the processing radiographic image corresponds to a different sensitive element, and it follows that each pixel is obtained with a projection corresponding to the direction of the vector joining the focal point Fj to the sensitive element specific to this pixel. However, by convention, it has been considered that the radiographic direction of projection for this one-dimensional processing radiographic image is the direction that joins the focal point Fj to the center of the linear image sensor implemented to acquire this one-dimensional processing radiographic image. A direction of projection Djik which is an average direction of projection for the one-dimensional processing radiographic image is therefore considered here.

Each pixel of the one-dimensional processing radiographic image Spk consists of a value representative of the signal collected by the corresponding sensitive element during the integration time of that pixel. The value of this signal therefore depends on the intensity of the X-ray received, therefore depends on the cumulative attenuation undergone by the X-ray between the focal point Fj and the corresponding sensitive element. This depends on the thickness and on the coefficient of the material or each of the layers of materials which have been traversed by the X-ray between the focal point Fj and the corresponding sensitive element. Each one-dimensional processing radiographic image Spk of the region to be inspected can therefore be represented by a set of these digital or analog values for the whole section of the object by the corresponding section plane, this set of values having been acquired in a single acquisition time of a linear sensor or in successive acquisition times of a point image sensor.

The invention provides that, for each object to be measured, and for each distinct section plane Pk, the delineation of the object in the considered section plane Pk is determined. This determination, in each section plane, is carried out based on a number of one-dimensional processing radiographic images of the region to be inspected, obtained along at least three different directions of projection Djik in the section plane, therefore based on at least three one-dimensional processing radiographic images Spk of this section of the region to be inspected of the object, preferably between 3 and 40, more preferably between 8 and 15, which are each obtained along a different direction of projection Djik in the section plane.

It is noted that this must be repeated for each section plane that intercepts the region to be inspected of the object. Thus, this has to be repeated for NK section planes Pk.

Also, in the examples of FIGS. 1 to 3, it is provided to use physical sensor components which are linear (only two of these linear physical sensor components are illustrated in FIG. 2). In these examples, each physical sensor component CC1, CC2, . . . , CCnmax includes a linear array of X-ray sensitive elements distributed along a support straight line Ln defining with the associated focal point Fj, a projection plane PPji (FIG. 2). In the example, the support straight lines Ln of the linear physical sensor components are parallel to each other and orthogonal to the conveying plane PC. In the example of FIG. 1, there are eight linear physical sensor components. These physical sensor components CCi are disposed such that at least m sensitive elements Cik of each of these physical sensor components receive a radiographic projection of the region to be inspected of the object by the X-ray beam derived from the focal point Fj during the displacement of the object between the focal point Fj and the sensor. In each section plane Pk, each linear physical sensor component CCi includes a single sensitive element Cik, The sensitive elements Cik of each linear physical sensor component CCi are therefore each capable of acquiring, by sampling during a scan duration corresponding to the duration of the displacement of the object between the focal point and the sensitive element, therefore by juxtaposition of several images acquired successively over time, a one-dimensional processing radiographic image Spk. It is understood that, in a given section plane Pk, each sensitive element present in this plane belongs to a different linear physical sensor component, and defines, with the focal point Fj, a different direction of projection, and that one-dimensional processing radiographic images Spk along different directions of projection Djik are obtained, in this case along as many different directions of projection as there are sensitive elements in the section plane Pk. As indicated above, the linear physical sensor components are preferably disposed such that they define different directions of projection Dji, Djik forming therebetween, taken in pairs, a minimum angle at least equal to 3 angle degrees, of preferably at least equal to 5 angle degrees in the section plane Pk, this in each implemented section plane Pk.

In the example of FIG. 5, the same principle is shown, but with two focal points F1 and F2, aligned on the base straight line B, each of which is associated with several, in this case five linear physical sensor components having their support straight lines Li parallel to each other and orthogonal to the conveying plane PC. Thus, for each section plane Pk, by sampling, for each linear physical sensor component, of the point image acquired by the sensitive element Cik of the linear physical sensor component which is comprised in the considered section plane, 10 one-dimensional processing radiographic images Spk along 10 different directions of projection Dji are obtained.

In the example of FIGS. 9 to 10, it is provided to use physical sensor components which are matrix, or two-dimensional sensor components. In this example, there are three of them. In this example, each physical sensor component CC1, CC2, CC3 includes a matrix array of X-ray sensitive elements distributed along a support plane. In the example, the support planes of the matrix physical sensor components CC1, CC2, CC3 are not parallel to each other. Indeed, in this example, each matrix physical sensor component CC1, CC2, CC3 is disposed such that its support plane is orthogonal to the direction of projection defined by the focal point Fj and the center of the matrix physical sensor component CC1, CC2, CC3. However, the matrix physical sensor components CC1, CC2, CC3, or at least some of them, could be parallel to each other. In this example, their respective support planes are perpendicular to the conveying plane PC. For each matrix physical sensor component CC1, CC2, CC3, at least m lines of sensitive elements Cik receive a radiographic projection of the region to be inspected of the object by the X-ray beam derived from the focal point Fj when the object is between the focal point Fj and the sensor. In each section plane Pk, each matrix physical sensor component CCi includes a line of sensitive elements which forms a linear image sensor Cik. The sensitive elements of this linear image sensor Cik are therefore capable, together, of acquiring a one-dimensional processing radiographic image Spk in a single acquisition time or integration time of the sensor. Generally, the sensitive elements on a matrix sensor component are disposed in a matrix arrangement, with a vertical (columns) and horizontal (rows) alignment of the sensitive elements. In the case where a matrix sensor component CCi constitutes a plane not parallel to the base straight line B, the intersection of the planes Pk with the plane of the matrix sensor component CCi is a straight line not aligned with the physical arrangement of the pixels. In this case, the linear image sensor Cik is a subset of sensitive elements that does not follow the horizontal or vertical alignment of the arrangement of the matrix sensor component. The linear image corresponding to the linear image sensor Cik, which is therefore part of the matrix sensor component CCi can be obtained by combining the values delivered by the sensitive elements cut by a virtual straight line, representing the linear image sensor Cik, possibly by also taking into account the pixels provided by the neighboring sensitive elements. For example, it is known to those skilled in the art to use interpolations and resampling in the combination of the pixels.

It is understood that, in a given section plane Pk, each line of sensitive elements forms a linear image sensor Cik in a matrix physical sensor component and defines, with the focal point Fj, a different direction of projection, and that one-dimensional processing radiographic images Spk along different directions of projection Djik are obtained, in this case along as many different directions of projection as there are matrix physical sensor components CCi.

From the delineations of the object in each distinct section plane, themselves each obtained from processing radiographic images along at least three different directions of projection in this section plane, it is possible to determine, for the object to be measured, at least one measurement of the linear dimension of the region to be inspected of the object to be measured. For example, such a measurement of the linear dimension of the region to be inspected of the object to be measured can be determined as being the distance between at least two three-dimensional points each belonging to a boundary surface of the region to be inspected. For this, the acquisition system is connected to a computer system, a non-limiting example of which is represented symbolically in FIG. 3, but which can be of all types known per se. According to one advantageous characteristic of embodiment, the computer system records using the image sensors Ci, Cik, for each object of the series during its displacement, radiographic images derived from a determined number of radiographic projections of the region to be inspected along different directions of projection.

It has been seen that the delineation of the object comprises a curve or a set of curves which represent the intersection, with the section plane Pk, of the boundary surfaces of the object. In such delineation, the curve or each curve of the delineation is a planar curve which can be modeled by a parametric system, in particular a system of one or several parametric equations. The curve or each of the curves of the delineation is preferably modeled by a fixed number of parameters. Such a delineation curve can for example be a polygonal curve. In this case, the coordinates of the vertices of the polygon can act as parameters.

Among the possible methods for determining a delineation of the object in the section plane, it is possible to implement a curve fitting algorithm starting from an a priori delineation of the object in the section plane.

Such an algorithm can be an iterative algorithm, in particular a non-linear regression algorithm.

As illustrated in FIG. 12, an iterative algorithm 100 likely to be used can thus iteratively implement a simulation step 110, a comparison step 120 and a step 130 of reducing errors by adjusting one or several parameters in the parametric system.

Such an algorithm can advantageously, as an initial step 101, take into account 101 an a priori delineation DLk1 of the object in the section plane Pk as a calculated delineation of first iteration rank. Such an a priori delineation DLk1 amounts to defining, in a given section plane, an initial curve or a set of initial curves, preferably sufficiently close to the expected delineation, which is however not known. Preferably, an initial delineation will allow determining the number and the order of the materials which are cut by a number of X-rays emitted by the focal point Fj, contained in the considered section plane, and collected by the image sensor after having passed through the object. This a priori delineation DLk1 can be drawn from an a priori geometric model of the object and/or from the measurement of one or several objects of the same series by a measuring device, and/or from values entered and/or drawings made and/or shapes selected by an operator on a man-machine interface of a computer system. In the case of a series of hollow cylindrical objects comprising only one material and having a theoretical central axis perpendicular to the conveying plane, the delineation in a section plane can consist of an initial internal curve and of an initial external curve, preferably closed curves, for example of the circle or ellipse type, or of the polygonal curve type. Such curves will be particularly effective for objects of revolution around the theoretical central axis. However, they can also be used with satisfactory results for objects whose section by a plane perpendicular to the theoretical central axis is of the prismatic type.

An iterative algorithm can then iteratively implement the following steps.

An iterated step can be a simulation step 110 which involves the calculation SIM, from the calculated delineation DLkr of a given iteration rank r of the object in the section plane, of a number NP at least equal to three of simulated one-dimensional radiographic images SSpkr, SSp'kr, SSp"kr of the region to be inspected, each calculated in the section plane Pk along one of the different directions of projection Djik which were used for the acquisition of the one-dimensional processing radiographic images Spk, Sp'k, Sp"k in the section plane.

Therefore, one of the one-dimensional processing radiographic images Spk, Sp'k, Sp'k is considered here, therefore an image for which actual values of the image signal are known, as collected by the image sensor. This image necessarily corresponds to a given direction of projection Dijk, therefore to a given focal point Fj and a given linear image sensor Cik. The principle is to calculate, at each given iteration rank of the iteration, an estimate SSpkr, SSp'kr, SSp"kr of the values representative of the signal that would be collected by this same sensor for an X-ray beam emitted by the same focal point Fj but after having passed through an object whose delineation would be the calculated delineation DLkr of given iteration rank r. During the first iteration, the calculated delineation of first delineation rank DLk1, namely the initial delineation can be used. For the following iterations, the delineation calculated during the previous iteration is used.

At each iteration, this calculation is performed for the number of one-dimensional processing radiographic images which are taken into account by the method in this section plane, namely at least three, for example between three and forty, in the sense of three to forty, inclusive, more preferably between four and fifteen, in the sense of four to fifteen, inclusive.

In this manner, it is then possible to perform, at each iteration, the comparison 120 of the simulated one-dimensional radiographic images SSpkr, SSp'kr, SSp"kr with the one-dimensional processing radiographic images Spk, Sp'k, Sp"k. This comparison can be made, for example for each simulated one-dimensional radiographic image as a comparison function COMP, for example a function of the differences of the signal values of the simulated one-dimensional radiographic image SSpk relative to the values of the linear processing radiographic image Spk corresponding to the same radiographic projection. This difference function can be a pixel-to-pixel difference function. This comparison can for example be carried out, by considering together several or all the simulated one-dimensional radiographic images SSpkr, SSpkr, SSp"kr with the associated one-dimensional processing radiographic images Spk, Sp'k, Sp"k, This comparison can for example comprise the calculation of a comparison value COMPVAL, which can be an error value, for example a square error value.

It is noted that this iterative algorithm works on linear processing radiographic images in a given section plane Pk, therefore on images that belong to the same plane. The calculations implemented in the iterative algorithm therefore relate to data belonging to the same determined plane Pk, corresponding to two-dimensional plane entities which constitute the delineations. This considerably simplifies the calculations relative to an iterative algorithm that would relate to data corresponding to three-dimensional entities.

Depending on the comparison, the iterative algorithm can then predict, for example at each iteration before the last one, the modification 130 of the calculated delineation having the considered iteration rank r into a new calculated delineation DLk(r+1) of higher iteration rank (r+1), which will be used for the next iteration, therefore of higher iteration rank. The modification implemented may be a modification function MOD, which can take into account the current delineation Dlkr, the comparison value COMPVAL calculated by the comparison function COMP at the comparison step 120, and/or possibly other calculations made in the previous iterations in order to decrease the value of this function COMPVAL at the following iteration according to the principle of the optimization descent methods. A modification function that can be used is, for example, a least squares method, for example a linear least squares method.

The steps above can indeed be reiterated until, for a last iteration, the comparison reaches a predefined optimization criterion CRIT. The achievement of this predefined optimization criterion can be verified during a verification step 125. For example, it is possible to verify whether a verification function returns a defined value. One or different criteria can be verified, such as the value of the function COMP relative to a threshold value, the number r of iterations relative to a maximum threshold number, etc. This verification can be based on the comparison value COMPVAL, for example by verifying that it has reached or exceeded a predefined square error value.

Typically, for each section plane, the number of different directions of projection Dji, Djik is between three and forty, in the sense of three to forty, inclusive, and preferably between four and fifteen, in the sense of four at fifteen, inclusive. Also, according to one advantageous variant of embodiment, the installation 1 includes, in a given section plane, between three and forty image sensors Ci, in the sense of three to forty, inclusive. According to one preferred variant of embodiment, the installation 1 includes, in a given section plane, between four and fifteen image sensors Ci, in the sense of four to fifteen, inclusive.

As will be explained in detail in the remainder of the description, the computer system is programmed to analyze, for each object, the at least three one-dimensional radiographic images derived, in each section plane of the at least three radiographic projections of different directions, so as to know the three-dimensional geometry of the object.

In some cases, it can thus be chosen to construct a digital geometric model of each measured object. This digital geometric model can be produced in any suitable manner, with a degree of accuracy depending on the accuracy required for the desired distance measurement. Thus, the digital geometric model can be constituted by at least two three-dimensional points each belonging to a boundary surface of the region to be inspected of the object and not located in a plane orthogonal to a direction of projection Dji, Djik, and not located in a parallel to the direction of displacement T. The at least two points can belong to two different boundary surfaces, for example to measure a thickness or an air gap.

The digital geometric model can also consist of one or more preferably several sections of the region to be inspected, each section being along a different plane from a plane orthogonal to a direction of projection Dji, Djik. This section plane can be one of the section planes Pk implemented for the acquisition of the images or be an even different plane. Furthermore, the digital geometric model can be constituted by at least one three-dimensional surface of the region to be inspected, different from a plane orthogonal to a direction of projection Dji, Djik and different from a plane parallel to the direction of displacement T.

According to the methods described above, for each measured object, the delineation of the object in a whole series of section plane Pk containing the base straight line B, therefore in fan-shaped planes around this base straight line is thus obtained. Each delineation can be made in the form of a parametric system, for example made in the form of a set of points and/or segments, in particular a set of points and/or segments belonging to outer boundary surfaces of the object. The set of the delineations thus obtained can be considered as a geometric model of the object, obtained by measurement. Alternatively, a geometric model of the object can be constructed from this set of delineations, for example by interpolation methods. Thus, the delineations in the planes Pk can be merged into 3D curves (boundaries), for example to obtain an STL type model. Then, it is possible to cut again the thus obtained 3D surface model by cutting planes which correspond to planes in which the measurements are performed.

In summary, the methods above allow the construction, for an object to be measured, using the computer system and from the delineations of the object in each of the distinct section planes Pk, of a three-dimensional digital geometric model of the region to be inspected comprising:

three-dimensional points in space each belonging to a boundary surface of the region to be inspected of the object;
and/or at least one three-dimensional surface of the region to be inspected.

In cases where the determination of a three-dimensional geometric model is implemented, a measurement of the linear dimension of the region to be inspected of the object to be measured can be determined by determining the distance between at least two three-dimensional points of the three-dimensional digital geometric model of the region to be inspected.

Of course, the invention allows constructing a digital geometric model with a large number of three-dimensional points or three-dimensional point clouds.

The digital geometric model is constructed by using the attenuation coefficient of the material(s) of the objects of the series.

In some embodiments of the invention, it has been seen that the delineations in each section plane, and therefore possibly a digital geometric model, can be constructed by using an a priori geometric model of the region to be inspected for the series of objects. In other words, in such a case, the computer system uses to construct the digital geometric model of each object, on the one hand, an a priori geometric model of the region to be inspected for the series of objects and, on the other hand, the attenuation coefficient of the material or the different attenuation coefficients of the different parts of each object of the series.

Thus, the computer system takes into account the attenuation coefficient(s) of the material(s) of the objects under inspection for this calculation operation. Advantageously, the installation 1 includes a device for making available to the computer system the attenuation coefficient(s) of the material(s) of the objects of a series.

This provisioning device can be made by a mass memory, a man-machine interface or by a wired or wireless computer network.

Likewise, in some embodiments, the computer system has a geometric model called a priori geometric model of the region to be inspected in order to perform this calculation operation. Thus, the installation 1 can include a device for making available to the computer system an a priori geometric model of the region to be inspected for the series of objects.

The device for making available to the computer system an a priori geometric model of the region to be inspected is for example a mass memory, a wired or wireless computer network or a man-machine interface.

As indicated in the definition part, the a priori geometric model is a digital model of the series of objects, which can be positioned in a reference frame linked to the device, and which can serve as an initialization for a method for determining the delineations of the object in each section plane Pk.

In the absence of knowledge of the a priori geometric model, the reconstruction can be extremely computationally expensive since its attenuation must be calculated for each point in the 3D space. The implementation of an a priori geometric model thus allows performing measurements of linear dimensions on objects, with good accuracy, in a very short time and at low cost.

According to a first variant, the a priori geometric model is obtained by the computer-aided design digital model for the objects of the series, produced during the design (3D CAD) of the objects. In this case, it is made available to the computer system by different possible means, such as a connection through a computer network to a database containing several CAD models corresponding to the various series of objects capable of being measured in production, a selection by the operator in a database internal to the installation, etc.

According to a second variant, the a priori geometric model is obtained from a digital geometric model constructed from the measurement of one or several objects of the same series by a measuring device, for example by a sensor-measuring machine or an axial tomography apparatus whose slowness compared to the invention is recalled. The a priori geometric model can be constructed by merging measurements of several manufactured objects of the same series.

According to a third variant, the a priori geometric model is a digital geometric model generated by the computer system from values entered and/or drawings made and/or shapes selected by an operator on the man-machine interface of the system.

For example, to provide the a priori geometric model in the case of a standardized type nut with six external sides M13, with a threaded hole, the following manner is sufficient. The operator enters on a keyboard the number and the height of the sides, the diameter and the thread pitch, the system being configured to inspect metric nuts. No additional specific side is specified. In another example, for the inspection of a single-material container made of glass or synthetic polymer material such as polyethylene or polyester, the operator only provides as information that the object is a cylinder closed at the base, surmounted by a cone, two diameters, two heights and one thickness are sufficient for the computer system to know an a priori geometric model of the object to be inspected. According to another example, the computer system can, through its interfaces, receive technical descriptions of the a priori model such as a number, diameters, depths and positions of various bores present in a surface which would be part of the region to be inspected of a larger object. The description can be geometric, for example if the computer system receives the number and general appearance of the boundary surfaces for describing it, the number of cavities, the number of faces or sides of a polyhedron. In summary, it should be understood that the a priori geometric model must at least contain sufficient technical, geometric, topological and/or digital information, to inform the computer system on the 3D structure of the object, the degree of detail and accuracy of this information can be very low without penalizing the accuracy sought for linear measurements.

One of the advantages offered by a determination of a geometric model is that it is possible to determine, by the same computer system or by another system to which this model would be provided, for each object of the series, from the digital geometric model of the region to be inspected corresponding to said object of the series, at least one linear measurement of the region to be inspected along any direction, therefore not necessarily contained in a plane orthogonal to a direction of projection, nor necessarily contained in a plane parallel to the direction of displacement.

At least one dimension and generally several dimensions are checked on the objects 2. The objective is generally to compare the measurements obtained on the objects with the required values, for example defined by a quality department. These dimension measurements or the deviations of these measurements relative to the required values can be displayed, recorded, etc. They can also be used to make decisions on the conformity of the objects which can be sorted automatically.

The measurements can be derived from the measurements of the digital geometric model of the inspected region established for each object. For example, the inspected region can include a bore. In the digital geometric model, it is possible to determine measurements of diameter or depth of the bore, by calculating on the digital geometric model the distances between diametrically opposite surface elements. When the object is a single-material object, the determination of the position of the surface elements can be more accurate with a minimum of calculations.

Another means for determining measurements of diameter or depth of the bore is by comparing the digital geometric model of the inspected region with a reference or theoretical geometric model.

The reference geometric model is an ideal model of the series of the inspected objects. To carry out a dimensional check, it is possible to compare the digital geometric model of the inspected region with the reference geometric model, by an algorithm comprising the matching of the models, then the measurement of the deviations between the models. The reference geometric model can be derived from the CAD.

It is thus possible to carry out an operation of matching the digital geometric model of the inspected region with the reference geometric model, then to determine dimension deviations by measuring distances between surface elements belonging to the reference model and surface elements belonging to the digital geometric model. In the example of the measurement of the bore, it is possible to virtually position a cylinder of maximum diameter inscribed in the modeled inner surface of the bore, and likewise a cylinder of minimum diameter containing said modeled inner surface, and to consider as measurements of the diameter of the bore in the inspected region, the diameter of either of the inscribed and escribed cylinders. This type of analysis is also possible to verify inner diameters in a neck of glass bottles obtained by the press-and-blow or blow-and-blow processes, or plastic bottles.

According to one variant of the invention, the reference geometric model and the a priori geometric model are the same geometric model.

According to another variant of the invention, the a priori geometric model is less accurate, less complete and/or is different from the reference geometric model.

To carry out such measurements, the installation advantageously includes a device for making available to the computer system values of linear dimensions, and/or tolerances on these dimensions, and/or reference geometric models According to one advantageous characteristic of embodiment, the computer system is connected to a device for displaying the linear measurement values of the region to be inspected and/or the dimensional deviations relative to reference values, and/or deviations between the digital geometric model of the inspected region and a reference geometric model. For example, for a nut are displayed measurements such as a thread depth, an average thread pitch, an average thread-root radius, a height, a minimum or maximum internal diameter, a flatness of one or several of its outer faces. For a glass or plastic container, the system will display the total height and for example the minimum diameter and the maximum diameter of the cylindrical part at a height predefined by the setting of the sides to be verified. The sides can be displayed with different colors according to their conformities or non-conformities.

According to one advantageous characteristic of embodiment, the computer system is connected to a device for sorting objects based on the linear measurement of the region to be inspected. Thus, this sorting device can, for example using an ejector, eject from the transport device the objects considered to be defective in consideration of the measured linear dimensions.

According to one advantageous characteristic of embodiment, the computer system can be connected to a device for marking the objects based on the linear measurement of the region to be inspected. This marking device can record for example the measured linear dimensions or the conformal or defective state of the object.

The relative positions of the focal points $F_j$ and the sensors $C_i$, $C_{ik}$ in a fixed reference frame $X, Y, Z$ of the installation are known to the computer system. This position can be obtained by hypothesis or by calibration. The calibration consists for example of placing or conveying an accurately machined gauge in the installation.

Of course, the relative positions of the focal points Fj and of the image sensors Ci, Cik are diverse by being reminded that the focal points Fj and the image sensors Ci, Cik are positioned outside the conveying volume Vt.

According to one variant of embodiment, the installation 1 includes a single focal point Fj=F1 disposed along one side of the conveying volume Vt and a series of linear physical sensor components CC1, CC2, . . . , CCnmax, disposed with their support straight line perpendicular to the conveying plane and each including image sensors for a multitude of section planes, disposed along the opposite side of the conveying volume Vt to receive the rays coming from the focal point F1 and having passed through the region to be inspected. In this example, the focal point has an opening Of which is measured in at least any plane, such as for example the plane X, Y in FIG. 1, which is greater than or equal to 120°. This opening Of is considered at the output of the focal point, in the case where the installation comprises, between the focal point and the volume Vt, or between the volume Vt and the image sensors, screens of limitation of the beams to the sole useful beams, in order to reduce the scattered one.

According to another variant of embodiment, at least two X-ray-producing focal points Fj (F1 and F2) are positioned separately in two distinct positions along a base straight line B parallel to the rectilinear trajectory of the objects, and at least three physical sensor components each including, for a multitude of section planes, X-ray sensitive image sensors, are placed such that each focal point is associated, in each section plane, with at least one image sensor, and that each image sensor is associated with a focal point and receives the X-rays derived from said focal point and passing through the region to be inspected. In this example, each focal point has an opening greater than or equal to 60° so that the sum of the openings of the two focal points is greater than or equal to 120°.

In the exemplary embodiment illustrated in FIGS. 5 and 6, the installation 1 includes two focal points F1, F2 aligned on a base straight line B parallel to the trajectory of the objects 2. The two focal points F1, F2 are each associated with a distinct generator tube 7. The installation 1 also includes five linear physical sensor components CC11, CC12, CC13, CC14 and CC15 which are disposed with their support straight line perpendicular to the conveying plane and which each include, for a multitude of section planes, image sensors each sensitive to rays X derived from the first associated focal point F1. The installation 1 also includes five linear physical sensor components CC21, CC22, CC23, CC24 and CC25 which are disposed with their support straight line perpendicular to the conveying plane and which each include, for a multitude of section planes, image sensors each sensitive to X-rays derived from the associated second focal point F2.

According to this exemplary embodiment, it should be noted that a focal point (F1 and F2 in the example) from which a divergent X-ray beam is derived is positioned on one side of the secant plane PS so that its beam passes through the secant plane PS and the region to be inspected, while at least one image sensor Ci associated with said focal point Fj to receive the X-rays derived from said focal point Fj is disposed on the opposite side relative to the secant plane PS. (In the example, these are the five image sensors C11, C12, C13, C14 and C15 each sensitive to X-rays derived from the associated focal point F1 and the five image sensors C21, C22, C23, C24 and C25 each sensitive to X-rays derived from the associated focal point F2).

According to one advantageous variant of embodiment, the focal point(s) Fj is/are disposed in the conveying plane PC. Preferably, these focal points cooperate with associated image sensors located at their opposites relative to the secant plane PS. Thus, in the case of a transport of the objects disposed on a planar conveyor, this disposition allows that in the radiographic images, the projections of the objects are not superimposed on the projection of the conveyor. Thus, in the digital geometric model of the objects, the part of the object in contact with the conveyor can be accurately determined.

According to one advantageous characteristic of embodiment, the disposition of the image sensors Ci and of the focal points is such that the X-rays derived from the focal point(s) Fj and reaching the image sensors Ci only pass through a region to be inspected at a time. In other words, the X-rays pass through only one object at a time. It should be noted that the installation can include a system for checking the spacing between the successive traveling objects.

One object of the invention is to obtain a method not only quick, but also inexpensive, able to calculate a three-dimensional geometry of each transported object on the line with the accuracy necessary for a dimensional check. The invention aims to reduce the number of images necessary for the reconstruction to the minimum number that allows reaching the desired dimensional accuracy. For example, the invention allows, with nine projections and a limited number of images of the inspected region, measuring with an accuracy of +1-0.05 mm the inner diameter of a cylinder between 10 and 120 mm. Advantageously, the installation in accordance with the invention includes between one and four focal points Fj and preferably one or two focal points Fj and preferably a number of image sensors for acquiring, in each section plane, radiographic projections between four and fifteen different directions of projection.

According to the invention, the image sensors and the focal point(s) should be disposed so that the combination of the at least three directions of projections optimizes the determination of the delineation of the inspected region of the objects transported on the line, in each of a multitude of section planes comprising a base straight line B parallel to the rectilinear trajectory T of the objects, considering that the traversed volume Vt should be left free for the circulation of the objects. The rules below are advantageously implemented within the scope of the invention, these rules being valid for linear or matrix image sensors.

In the following, an angle is an absolute value. FIGS. 7 and 8 illustrate two directions of projection Dji and D'ji which are also vectors. Two directions of projection Dji and D'ji which are contained in the same section plane Pk are considered here. These Figures show the angle $\alpha$ between these two directions of projection, namely $\alpha=(\widehat{Dij, D'ij})$ and s the angle complementary to the angle a, namely s=180°-a. By definition, the effective angle $\alpha$ between two different directions of projection Dji and D'ji in the section plane Pk, is the smallest of the angles a and s, namely $\alpha$=Min(a, s). Thus, the effective angle $\alpha$ is the smallest of the angles formed by the two straight lines carrying the directions of projection Dji, D'ji.

According to one advantageous variant of the invention, at least two images derived from two radiographic projections along two different directions Dji and D'ji forming therebetween an effective angle $\alpha$ greater than or equal to 45° and less than or equal to 90° are acquired for each object and for each section plane Pk, among the at least three radiographic images derived from radiographic projections along at least three different directions of projection. According to one advantageous variant of the invention, at least two images derived from two radiographic projections along two different directions forming therebetween an effective angle α greater than or equal to 60° and less than or equal to 90° are acquired for each object and for each section plane, among the at least three radiographic images derived from radiographic projections along different directions.

To do so, the installation 1 according to the invention includes at least one focal point and two image sensors disposed such that the directions of projection of the inspected region they receive have therebetween an effective angle α greater than or equal to 45° and less than or equal to 90° and, advantageously greater than or equal to 60° and less than or equal to 90°.

For example as illustrated in FIG. 5, the effective angle α between the directions D15 and D11, and between the directions D13 and D25 are greater than 45°. Obviously, it must be understood that at least one effective angle is greater than or equal to 45° and less than or equal to 90° and advantageously that at least one effective angle is greater than or equal to 60° and less than or equal to 90° and the other effective angles between two directions Dji, D'ji are arbitrary. Those skilled in the art using this rule will know how to look for a disposition which offers the most complete possible distribution of the directions of projections of the inspected region.

In a particular case, it can be provided that the focal points are in the conveying plane PC, and that the physical sensor components are positioned so that the conveying plane PC is one of the section planes Pk. Then, in the section plane Pk corresponding to the conveying plane PC, this condition applies, namely at least two images derived from two radiographic projections along two different directions forming therebetween an effective angle α greater than or equal to 60° and less than or equal to 90° are acquired for each object and for the horizontal section plane Pk coincident with the conveying plane PC, among the at least three radiographic images derived from radiographic projections along different directions.

Preferably, the effective angle α between two consecutive directions of projection Dijk in a given section plane Pk is identical for all the consecutive directions of projection Dijk implemented to acquire the one-dimensional processing images in the given section plane Pk. In other words, the directions of projection Dijk implemented to acquire the at least three one-dimensional processing images in a given section plane Pk are angularly spaced evenly in the given section plane Pk. Preferably, the directions of projection implemented to acquire the at least three one-dimensional processing images in a given section plane Pk are angularly distributed in the section plane Pk so as to cover the angular amplitude, measured in this section plane Pk, covered by the opening Of of the focal point(s) Fj, preferably so as to cover at least 50% of this angular amplitude, preferably at least 75% of this amplitude.

According to another advantageous characteristic, for each object, the computer system acquires at least one radiographic image of the inspected region corresponding to a direction of projection forming, in orthogonal projection on the conveying plane PC, an opening angle 1 determined with the direction of displacement T.

As illustrated in FIG. 9, the angle p is considered between a direction of projection (vector Dji) brought in orthogonal projection on the conveying plane PC, and the trajectory of the objects (vector T), namely the angle p=(Dji, T) i.e. p=(D11, T) and p=(D12, T) in the example illustrated in FIG. 9. The angle q complementary to the angle p is such that q=180°-p. By definition, the opening angle 3 between a direction of projection Dji brought in orthogonal projection on the conveying plane PC, and the trajectory T is the smallest of the angles p and q, namely β=Min (p, q). Thus, the opening angle β is the smallest of the angles formed by the two straight lines, one carrying the direction of projection Dji brought in orthogonal projection on the conveying plane PC, and the other carrying the trajectory T.

According to another advantageous characteristic, for each object, the computer system acquires at least one radiographic image of the inspected region corresponding to a direction of projection Dji, Djik having with the direction of displacement T, an opening angle β between 10° and 60°. In other words, the installation according to the invention includes at least one focal point and one image sensor Ci disposed such that, when an object passes through the field of the image sensors, the direction of projection Dji, Djik of the region inspected on the image sensor Ci forms an opening angle β with the direction of displacement T comprised between 10° and 60°.

In other words, the configuration of the installation 1 is optimized to reduce its bulk in the direction of displacement while maintaining a traversed volume Vt adapted to the objects and a good quality of reconstruction.

Due to the traversed volume Vt, the installation does not produce a projection around the direction of displacement T. The traversed volume Vt imposes a minimum opening angle β min. For example, the minimum opening angle β min=10°. There is no sensor disposed so as to provide a projection of opening angle β less than 10°.

It must be deduced from the foregoing that the distribution of the projection angles for each object is not necessarily uniform.

As illustrated in FIG. 9, the distribution of the projection angles can present a gap, called blind spot region, of twice 2×10° namely 20°, instead of having full coverage over 180°.

For example, as illustrated in FIG. 9, an installation according to the invention includes at least one focal point F1 and two physical sensor components CC1, CC2, here among three and for example two-dimensional sensor components, which each include, for a multitude of section planes Pk, image sensors C1k, C2k, C3k, for which the directions of projections D11, D12, brought into orthogonal projection on the conveying plane PC, define with the direction of displacement T, an opening angle β comprised between 10° and 60° corresponding respectively to the angles p and q. Likewise, the installation illustrated in FIG. 5 includes an image sensor CC11 associated with the focal point F1 and whose direction of projection D11 forms an opening angle β comprised between 10° and 60° relative to the direction of displacement T.

The physical sensor components that form the image sensors Ci are generally of the matrix or linear type.

According to one preferred variant of embodiment, the installation 1 includes linear physical sensor components. According to this preferred variant, each physical sensor component CCi, CCi' includes a linear array of X-ray sensitive elements distributed along a support straight line Li, Li' defining with the associated focal point Fj, a projection plane PPji, PPji' containing the direction of projection Dji (FIG. 2). These physical sensor components Ci are disposed such that at least m sensitive elements of each of these image sensors receive the radiographic projection of the region to be inspected by the X-ray beam derived from the associated focal point Fj, with the projection planes PPji for the different physical sensor components which are distinct from each other and not parallel to the conveying plane PC. The number m of sensitive elements of each physical sensor component is greater than 128, preferably greater than 512. The distance between neighboring sensitive elements (called pitch) and/or the dimension of the sensitive elements is preferably less than 800 μm. The frequency of reading the image lines is preferably greater than 100 Hz, advantageously greater than 1 kHz. Of course, these parameters are adapted based on the size of the objects, the desired accuracy and the traveling speed. Thus, by properly disposing the physical sensor components, planes Pk spaced vertically by the value of the pitch can be obtained, the spacing being measured at the sensors. It is possible that the number of section planes Pk reaches 128, even 512, or even more.

According to one advantageous characteristic of embodiment, the support straight lines Li of at least three linear physical sensor components Ci are parallel to each other.

According to another advantageous characteristic of embodiment, the support straight lines Li of at least three linear physical sensor components Ci are orthogonal to the conveying plane PC.

According to one variant, a focal point Fj is positioned so that its beam passes through the inspected region and then the conveying plane PC. In addition, at least one associated linear physical sensor component Ci is positioned opposite the focal point Fj relative to the conveying plane PC and such that its support straight line Li is parallel to the conveying plane PC.

According to these variants of embodiment with linear physical sensor components, the acquisition system acquires using each of the at least three physical sensor components Ci, at each incremental displacement of each object on the trajectory, linear radiographic images of the region to be inspected based on a number chosen so that for each object, the whole region to be inspected is fully represented in the set of the linear radiographic images. Thus, during the displacement of an object, each image sensor is able to acquire linear radiographic images so that the whole region to be inspected of the object is fully represented in the set of the linear radiographic images obtained from said image sensor. Thus, for each object, at least three sets of linear radiographic images of the region to be inspected are obtained and then analyzed. It is possible to constitute matrix radiographic images of the inspected region by juxtaposition of the sets of linear radiographic images. But the reconstruction of the geometric model and the measurement do not necessarily impose it.

It should be noted that given the traversed volume Vt, no radiographic projection is acquired in the blind spot region ($\beta < \pm 10°$) located on either side of the direction of displacement T. The method according to the invention allows, despite the absence of radiographic projections in this range of angles, reconstructing, for example thanks to the a priori geometric model, an accurate and complete digital geometric model of the object. It is thus possible to perform measurements of linear dimension on the entire digital geometric model and particularly along directions not orthogonal to the possible directions of projection, including measurements of linear dimension along directions of measurement orthogonal to the directions of missing projections corresponding to the blind spot region located on either side of the direction of displacement T. Indeed, without the method according to the invention, for example with the methods intended for traditional "complete" axial tomography, in the case where no radiographic projection is acquired along the directions of a blind spot, then the model reconstructed also presents in an angular sector orthogonal to the blind spot, reconstruction errors making it impossible to determine a surface accurately and therefore making impossible any measurement of linear dimension of an object, even single-material object.

Thus, as illustrated in FIGS. 10 and 11, according to the invention, no projection is possible in a blind spot of for example 20° ($\beta$ min=10°). According to the prior art, no accurate measurement could be performed in the direction A, which is not orthogonal to any of the directions of projection. The direction A is not close to the orthogonal of any of the directions of projection within at least 10°, in the sense that it has, in orthogonal projection on the conveying plane PC, an angular deviation of at least 10 angle degrees with any of the directions of projection. With the reconstruction from a priori models of the series of objects and from the constant and uniform attenuation, the measurement of the internal diameter along the direction A (distance a1) and the measurement of the distance between the two external sides perpendicular to direction A (distance a2) are correct and accurate. In other words, the three-dimensional geometry determined for the region to be inspected does not have any missing or blurred boundaries in the direction A.

Of course, the number of focal points, the number of image sensors associated with each focal point, and their relative dispositions are chosen in any suitable manner based on the desired degree of measurement accuracy, on the shape of the objects and on their spacing on the conveyor.

In summary, as schematically illustrated in FIG. 13, the method of the invention provides:

the transport of the objects (TRANS OBJ), during this transport, the acquisition (ACQUIMAGE), using the image sensor(s) Ci, Cik, for each object during its displacement, of a set of one-dimensional processing radiographic images, comprising:

one-dimensional processing radiographic images for a number NK of distinct section planes Pk containing the base straight line;

for each distinct section plane Pk, a number NP of one-dimensional processing radiographic images Spk of the region to be inspected, obtained along at least three different directions of projection Dijk in the section plane;

for each object to be measured, and for each distinct section plane Pk, the determination (CALC DLk), using the computer system, of a delineation of the object DLk in the considered section plane Pk, from the at least three one-dimensional processing radiographic images Spk of the region to be inspected, obtained along the at least three different directions of projection Dijk in the section plane, and the determination (MES), for an object to be measured, from the delineations of the object in each distinct section plane, of at least one linear dimension measurement of the region to be inspected of the object to be measured.

The method allows the real-time computer processing of the images to create a three-dimensional model in order to measure fast traveling objects in production. The disposition and the translational movement allow working in the section planes Pk. It is possible to use reconstruction algorithms in the section planes Pk which manipulate by computer two-dimensional geometries, which is by computer much faster than manipulating three-dimensional data. It is thus possible to manipulate by computer parametric curves, which is much faster than manipulating elementary volume elements of a volume model. The method can take into account a priori information of the objects, to further limit the computing power necessary for the implementation. The proposed method allows reconstructions without the area called "missing edge" error area in the direction orthogonal to the displacement, despite the image absence of directions of projection close to the direction of displacement.

Thanks to the acquisition geometry proposed by the method, the problem of the 3D reconstruction of the object from the acquired radiographic data is decoupled into NK problems of reconstructions of oblique 2D sections of the object, which limits the computing power necessary for the implementation. Indeed, the problem of 3D reconstruction from A acquisitions on C linear sensors produces A×C×NK data and would allow estimation on the order of A×C×NK voxels in an algebraic approach, by solving a linear system on the order of A×C×NK by A×C×NK. The cost of such an operation is on the order of (A×C×NK)^3 by a Gauss-type method and iter3D×(A+C+NK)×A×C×NK for an iterative method utilizing the hollow nature of the matrix, with iter3D iterations.

In one approach decoupled in NK reconstruction problems of oblique 2D sections of the object, NK linear systems on the order of A×C by A×C should be solved, namely a cost on the order of NK×(A×C)^3 by a Gauss-type method (an NK^2 factor is gained) and iter2D*(A+C)×A×C×NK with here in general iter2D<iter3D and of course (A+C)<(A+C+NK). The method therefore requires much less calculations, and therefore less computing power. This gain in complexity is found in the fact that it is possible to reconstruct curves in each 2D section which is much simpler than reconstructing a surface in 3D: the volume of data in local memory is lower, and the complexity of the management of the curves is much lower than that of the surfaces.

It is noted that, since the trajectory of the objects is a translation, and since each of the section planes contains the base straight line and is consequently parallel to the trajectory of the objects, each of the section planes Pk is invariant relative to the object during the translation. Thus, all the one-dimensional processing radiographic images Spk of the region to be inspected obtained in the same section plane Pk are one-dimensional radiographic images of the same section of the object, therefore of the same delineation of the object. It is therefore seen that the acquisition geometry proposed by the method allows working directly on data belonging to the same plane, which considerably simplifies the calculations.

It should be noted that in industrial mass production, it is possible that several series are present at the same time on the same manufacturing or check line. In this case, the installation includes an indication system for indicating to the computer system the series to which each of the objects belongs in order to implement the method of the invention for all the objects of the same series. Indeed, the installation according to the invention can be used to inspect a flow of manufactured objects composed of many different series of objects, for example a first series and a second series. The series may differ in the shape of the objects or in their own attenuation coefficient, or both. In this case, the installation must be equipped with a means for making available to the computer system an a priori geometry model of each series of objects, an attenuation coefficient of each series of objects and it is necessary to provide a means for associating in the computer system the radiographic images of each object with the series to which it belongs.

The invention claimed is:

1. A method for automatically measuring linear dimensions of manufactured objects (2) of a series comprising:
   the choice of a series of manufactured objects (2) in which each of said objects consists of one or several distinct parts, the number of parts being known and each part being made of a material with a known attenuation coefficient which is uniform at every point of the part of the object;
   the transport, by means of a transport device, of the objects in a direction of displacement (T) along a rectilinear trajectory in a conveying plane (PC), these objects generating a conveying volume (Vt) during their displacement;
   the disposition, outside the conveying volume (Vt),
      of at least one focal point (Fj) of an X-ray generating tube, each focal point being arranged on a same base straight line parallel to the direction of displacement (T) along the rectilinear trajectory and
      of one or several image sensors (Ci) each exposed and sensitive to X-rays derived from an associated focal point (Fj), these X-rays having passed through at least the region to be inspected producing on each image sensor a radiographic projection of the region to be inspected along a direction of projection (Dji, Djik);
   the acquisition, using the image sensor(s) (Ci, Cik), for each object during its displacement, of a set of one-dimensional processing radiographic images, each one-dimensional processing radiographic image comprising a projection of a section of the object along a section plane (Pk) containing the base straight line, the set comprising:
      said one-dimensional processing radiographic images for a number (NK) of distinct section planes (Pk) containing the base straight line;
      for each distinct section plane (Pk), a number (NP) of said one-dimensional processing radiographic images (Spk) of the region to be inspected, obtained along at least three different directions of projection (Dijk) in the section plane;
   for each object to be measured, and for each distinct section plane (Pk), the determination, using the computer system, of a delineation of the object in the considered section plane (Pk), from the one-dimensional processing radiographic images (Spk) of the region to be inspected, obtained along the at least three different directions of projection (Dijk) in the section plane,
   and the determination, for an object to be measured, from the delineations of the object in each distinct section plane, of at least one measurement of the linear dimension of the region to be inspected of the object to be measured.

2. The method according to claim 1, characterized in that a delineation of the object comprises a curve or a set of curves which represent the intersection, with the section plane, of the boundary surfaces of the object.

3. The method according to claim 2, characterized in that the curve or each curve of the delineation of the object is a planar curve modeled by a parametric system.

4. The method according to claim 1, characterized in that the determination of a delineation of the object in the section plane comprises a curve fitting algorithm starting from an a priori delineation of the object in the section plane.

5. The method according to claim 1, characterized in that the determination of a delineation of the object in the section plane comprises a non-linear regression-type curve fitting algorithm.

6. The method according to claim 1, characterized in that the determination of a delineation of the object in the section plane comprises an iterative curve fitting algorithm comprising:
the consideration of an a priori delineation of the object in the section plane as a calculated delineation of first iteration rank;
then iteratively,
the calculation, from the calculated delineation of a given iteration rank of the object in the section plane, of a number (NP) at least equal to three of simulated one-dimensional radiographic images (SSpk) of the region to be inspected, calculated in the section plane along the at least three different directions of projection (Dijk) which are used for the acquisition of the one-dimensional processing radiographic images (Spk) in the section plane,
the comparison of the simulated one-dimensional radiographic images (SSpk) with the one-dimensional processing radiographic images (Spk),
depending on the comparison, the modification of the calculated delineation into a calculated delineation of higher iteration rank, until the comparison of the simulated one-dimensional radiographic images (SSpk) with the one-dimensional processing radiographic images (Spk) reaches a predefined optimization criterion.

7. The method according to claim 1, characterized in that it includes:
the acquisition, using the image sensors (Ci, Cik), for each object during its displacement, of a number (NP) at least equal to three of two-dimensional radiographic images (Ri) of the region to be inspected, each obtained along a different direction of projection (Dji),
the extraction, in the two-dimensional radiographic images (RI), of the one-dimensional processing radiographic images (Spk) to form the set of one-dimensional radiographic images.

8. The method according to claim 1, characterized in that a one-dimensional processing radiographic image (Spk) of an object is formed by sampling of a point image acquired using a point image sensor (Cik), during a scan duration corresponding to the duration of the displacement of the object between the focal point and the point image sensor (Cik).

9. The method according to claim 1, characterized in that it comprises the construction, for an object to be measured, using the computer system and from the delineations of the object in each of the distinct section planes (Pk), of a three-dimensional digital geometric model of the region to be inspected comprising:
three-dimensional points in space each belonging to a boundary surface of the region to be inspected of the object;
and/or at least one three-dimensional surface of the region to be inspected.

10. The method according to claim 9, characterized in that the determination, for an object to be measured, from the delineations of the object in each distinct section plane, of at least one measurement of the linear dimension of the region to be inspected of the object to be measured comprises the determination of the distance between at least two three-dimensional points of the three-dimensional digital geometric model of the region to be inspected.

11. The method according to claim 1, characterized in that it comprises the provision to the computer system, for each section plane, of an a priori delineation of the object in the section plane.

12. The method according to claim 11, characterized in that the a priori delineations are obtained by:
a computer-aided design digital model of the objects of the series;
and/or from the measurement of one or several objects of the same series by a measuring device;
and/or from values entered and/or drawings made and/or shapes selected by an operator on a man-machine interface of a computer system.

13. The method according to claim 1, characterized in that it comprises the provision to the computer system of an a priori three-dimensional geometric model of the region to be inspected of the series, which is obtained by:
a computer-aided design digital model of the objects of the series;
and/or a digital geometric model obtained from the measurement of one or several objects of the same series by a measuring device;
and/or a digital geometric model generated by a computer system from values entered and/or drawings made and/or shapes selected by an operator on a man-machine interface of the computer system.

14. The method according to claim 1, characterized in that it comprises the disposition of the focal point(s) in the conveying plane (PC).

15. The method according to claim 1, characterized in that it comprises the acquisition, using the image sensor(s) (Ci, Cik), for an object of the series during its displacement, and for each considered section plane (Pk) of the object, of at least two one-dimensional processing radiographic images of the inspected region corresponding to directions of projection (Djik) defining, in the considered section plane, an effective angle ($\alpha$) greater than or equal to 45° and less than or equal to 90° and, advantageously greater than or equal to 60° and less than or equal to 90°.

16. The method according to claim 1, characterized in that it comprises the acquisition, using the image sensor(s) (Ci, Cik), for an object of the series during its displacement, and for each considered section plane (Pk) of the object, of at least one radiographic image of the inspected region corresponding to a direction of projection (Djik) having, brought into projection in the conveying plane (PC), an opening angle ($\beta$) with the direction of displacement (T) comprised between 10° and 60°.

17. The method according to claim 1, characterized in that it does not comprise the acquisition, using the image sensor(s) (Ci, Cik), for each object of the series during its displacement, of any radiographic image of the inspected region corresponding to a direction of projection (Dji, Djik) having an opening angle ($\beta$) with the direction of displacement (T) less than 10°.

18. The method according to claim 1, characterized in that it comprises the execution and the acquisition of the radiographic projections of the inspected region of an object such that the X-rays derived from the focal point(s) and reaching the image sensors (Ci) do not pass through another object.

19. The method according to claim 1, characterized in that it comprises the acquisition, for each object of the series during its displacement and for each section plane, of the one-dimensional processing radiographic images derived from between three and forty radiographic projections of the region to be inspected of different directions of projection, preferably derived from between four and fifteen radiographic projections of the region to be inspected of different directions of projection.

20. The method according to claim 1, characterized in that:
the image sensors (Ci) form part of at least three physical sensor components (CCi) which are each of linear type, each including a linear array of X-ray sensitive elements distributed along a support straight line (Li), which defines with a focal point (Fj) a projection plane (PPji) containing the direction of projection (Dji, Djik), these image sensors being disposed such that:
at least m sensitive elements of each of these physical sensor components receive the radiographic projection of the region to be inspected by the X-ray beam derived from a focal point (Fj);
the projection planes (PPji) for the different physical sensor components are distinct from each other and not parallel to the conveying plane (PC);
using each of the at least three linear physical sensor components (Ci), at each incremental displacement of each object along the trajectory (T), one-dimensional radiographic images of the region to be inspected are acquired according to a number chosen such that for each object, the whole region to be inspected is fully represented in the set of one-dimensional radiographic images;
the at least three sets of one-dimensional radiographic images of the region to be inspected are analyzed for each object.

21. An installation for automatically measuring linear dimensions of at least one region to be inspected of manufactured objects of a series, the installation including:
a device for transporting the objects in a direction materialized by a displacement vector (T), along a rectilinear trajectory in a conveying plane (PC), the objects traveling through an conveying volume (Vt) extending in the direction of displacement (T);
at least one focal point (Fj) of an X-ray generating tube located outside the traversed volume (Vt), and creating a divergent X-ray beam directed to pass through at least one region to be inspected of the object, each focal point being arranged on a same base straight line parallel to the direction of displacement (T) along a rectilinear trajectory;
image sensors (Ci, Cik), located outside the conveying volume (Vt) so as to receive X-rays derived from an associated focal point (Fj), the focal point(s) (Fj) and the image sensors (Ci) being disposed such that each image sensor receives the radiographic projection of the region to be inspected by the rays derived from the focal point (Fj) when the object passes through these rays, the directions of projection of these radiographic projections being different from each other;
an acquisition system connected to the image sensors (Ci, Cik), so as to acquire for each object during its displacement, a set of one-dimensional processing radiographic images, the set including:
said one-dimensional processing radiographic images for a number (NK) of distinct section planes (Pk) containing the base straight line;
for each distinct section plane (Pk), a number (NP) of said one-dimensional processing radiographic images (Spk) of the region to be inspected, obtained along at least three different directions of projection (Dijk) in the section plane;
a computer system configured:
for each distinct section plane (Pk), to determine a delineation of the object in the considered section plane (Pk), from said one-dimensional processing radiographic images (Spk) obtained along the at least three different directions of projection (Dijk) in the section plane.

22. The installation according to claim 21, characterized in that it includes at least two X-ray-producing focal points (F1, F2), positioned separately in two distinct positions on the same base straight line parallel to the direction of displacement (T) along the rectilinear trajectory, and at least three image sensors (Ci), sensitive to X-rays and positioned such that:
each focal point emits its beam through at least the region to be inspected to reach at least one associated sensor (Ci, Cik);
each sensor (Ci) is associated with a focal point and receives the X-rays derived from said focal point after having passed through the region to be inspected.

23. The installation according to claim 21, characterized in that it includes at least one focal point from which is derived a divergent X-ray beam with an opening greater than or equal to 90' or at least two focal points from which are derived divergent X-ray beams, the sum of the openings of which is greater than or equal to 90°.

24. The installation according to claim 21, characterized in that it includes at least one focal point disposed in the conveying plane (PC).

25. The installation according to claim 22 characterized in that at least one focal point and two image sensors are disposed such that the directions of projection of the inspected region they receive have therebetween an effective angle ($\alpha$) greater than or equal to 45° and less than or equal to 90° and, advantageously greater than or equal to 60° and less than or equal to 90°, and optionally either wherein the installation includes at least one focal point from which is derived a divergent X-ray beam with an opening greater than or equal to 90° or at least two focal points from which are derived divergent X-ray beams, the sum of the openings of which is greater than or equal to 90° or the installation includes at least one focal point disposed in the conveying plane (PC).

26. The installation according to claim 21, characterized in that at least one focal point and one image sensor (Ci) are disposed such that, when an object passes through the field of the sensors, the direction of projection (Dji, Djik) of the region inspected on the image sensor (CUE, Ci) forms an opening angle ($\beta$) with the direction of displacement (T) comprised between 10° and 60°.

27. The installation according to claim 21, characterized in that, as no focal point (Fj) of an X-ray generating tube is located in the traversed volume (Vt), and no image sensor (Ci) is located in the conveying volume (Vt), the direction of projection (Dji, Djik) of the inspected region on the image sensor (Ci) never forms an opening angle ($\beta$) with the direction of displacement (T) less than 10°.

28. The installation according to claim 21, characterized in that the image sensors (Ci) and the focal points (Fj) are disposed so that the X-rays derived from the focal point(s) and reaching the image sensors (Cik, Ci) and passing through the region of an object do not pass through another object at a time.

29. The installation according to claim 21, characterized in that it includes between one and four focal points (Fj), derived from one or several X-ray generating tubes.

30. The installation according to claim 21, characterized in that the number and the disposition of the image sensors (Cik) and of the associated focal points are such that, for each object of the series during its displacement, the radiographic projections of the region to be inspected on the image sensors have between three and forty different directions of projection, preferably between four and fifteen different directions of projection.

31. The installation according to claim 21, characterized in that the image sensors (Ci) form part of physical sensor components (CCi) of linear type each including a linear array of X-ray sensitive elements distributed along a support straight line (Li), which defines with an associated focal point (Fj) a projection plane (PPji) containing the direction of projection (Dji, Djik), these image sensors being disposed such that:
- at least m sensitive elements of each of these physical sensor components (CCi) receive the radiographic projection of the region to be inspected by the X-ray beam derived from the associated focal point (Fj);
- the projection planes (PPji) for the different sensors are distinct from each other and not parallel to the conveying plane (PC).

32. The installation according to claim 31, characterized in that the support straight lines (Li) of at least three linear image sensors (Ci) are parallel to each other.

33. The installation according to claim 31, characterized in that the support straight lines (Li) of at least three linear physical sensor components (CCi) are orthogonal to the conveying plane (PC).

* * * * *